United States Patent [19]

Kukesh

[11] Patent Number: 4,809,909

[45] Date of Patent: Mar. 7, 1989

[54] PLURAL COMPONENT APPLICATION SYSTEM

[75] Inventor: Timothy S. Kukesh, Indianapolis, Ind.

[73] Assignee: Glas-Craft, Inc., Indianapolis, Ind.

[21] Appl. No.: 927,837

[22] Filed: Nov. 5, 1986

Related U.S. Application Data

[63] Continuation-in-part of Ser. No. 744,280, Jun. 13, 1985, abandoned.

[51] Int. Cl.[4] ............................ B05B 7/04; B05B 7/16
[52] U.S. Cl. ........................................ 239/1; 239/61;
  239/74; 239/124; 239/135; 239/336; 239/DIG. 8; 417/218; 427/196; 427/426
[58] Field of Search ............... 428/113; 427/196, 426; 156/62.2; 239/61, 71, 74, 75, 124, 127, 135, 336, DIG. 8,1, 13; 417/218

[56] References Cited

U.S. PATENT DOCUMENTS

| | | | |
|---|---|---|---|
| 2,955,058 | 10/1960 | Foster | 427/426 |
| 3,096,225 | 7/1963 | Carr et al. | 239/336 X |
| 3,155,320 | 11/1964 | Jones | 239/336 X |
| 3,307,789 | 3/1967 | Clark | 427/426 |
| 3,462,083 | 8/1969 | Kautz | 427/426 X |
| 3,504,855 | 4/1970 | Volker | 239/336 X |
| 3,542,296 | 11/1970 | Bradley | 239/DIG. 8 X |
| 3,759,450 | 9/1973 | Fram et al. | 239/427 |
| 3,765,605 | 10/1973 | Gusmer et al. | 239/61 |
| 3,799,403 | 3/1974 | Probst | 222/135 |
| 3,921,901 | 11/1975 | Woodman | 239/61 X |
| 4,278,205 | 7/1981 | Binoche | 239/75 |

FOREIGN PATENT DOCUMENTS

3007599 9/1981 Fed. Rep. of Germany ...... 417/429

OTHER PUBLICATIONS

Probler Basic Operation Manual, Glas-Craft, Inc., Indianapolis, Ind.
Hydraulic Power Unit Operation Manual (Oct. 1984), Glas-Craft, Inc., Indianapolis, Ind.
"Rim Series" Operation and Parts Manual (Dec. 1982), Glas-Craft, Inc., Indianapolis, Ind.
"Probler Gun" Brochure, Glas-Craft, Inc., Indianapolis, Ind.
"Rim Series" Brochure (Jan. 1984), Glas-Craft, Inc., Indianapolis, Ind.
"Probler T-3" Brochure, Glas-Craft, Inc., Indianapolis, Ind.
"Flat Spray Conversion Kits" Card.

Primary Examiner—Andres Kashnikow
Attorney, Agent, or Firm—Willian Brinks Olds Hofer Gilson & Lione

[57] ABSTRACT

An apparatus and method for manufacturing plural component materials, especially rigid urethane structures, from reactive components. The system includes a source of a first component, a source of a second component, a sprayer for mixing the components and for dispensing the mixture therefrom, and a delivery system for delivering the components to the sprayer. The delivery system is designed to continuously recirculate the components from their respective sources to the sprayer and back to the sources and includes positive displacement piston pumps simultaneously driven by a single motor. The system further includes means for calibrating the rates of flow of the components in the delivery system and a chopper to direct reinforcing glass fibers into the component mixture dispensed from the sprayer.

26 Claims, 10 Drawing Sheets

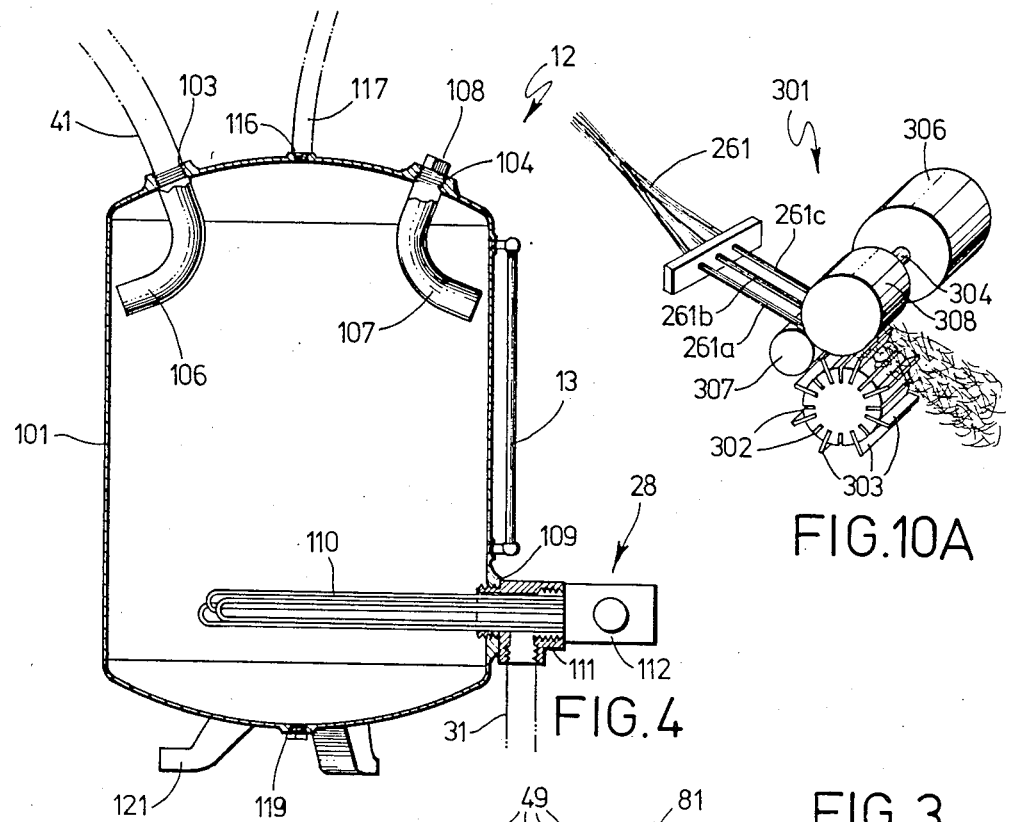
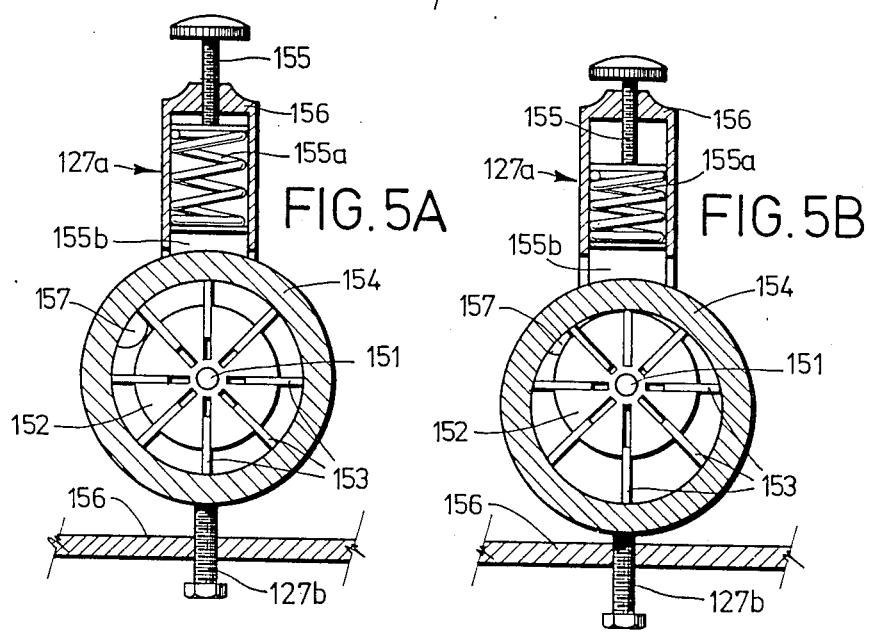

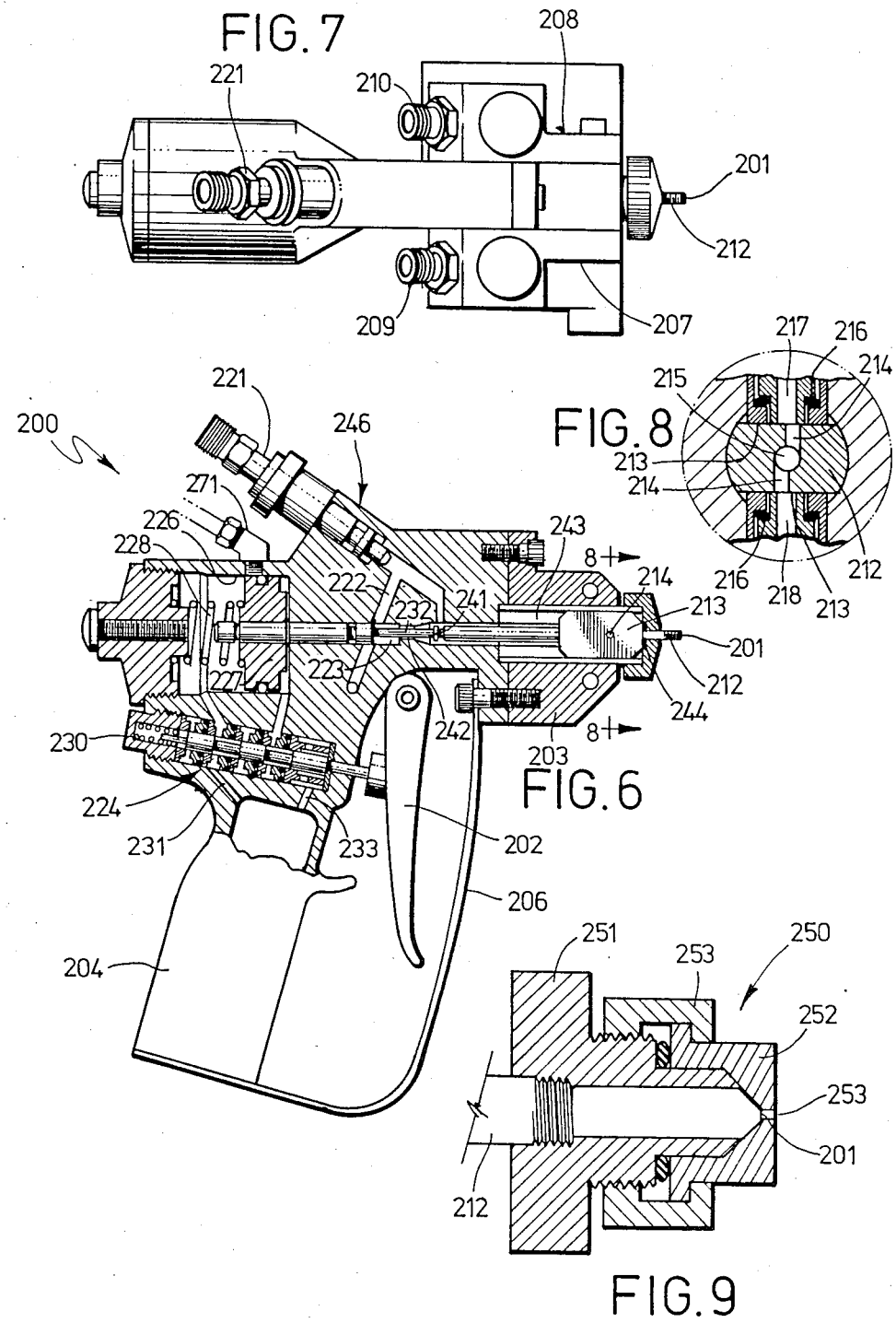

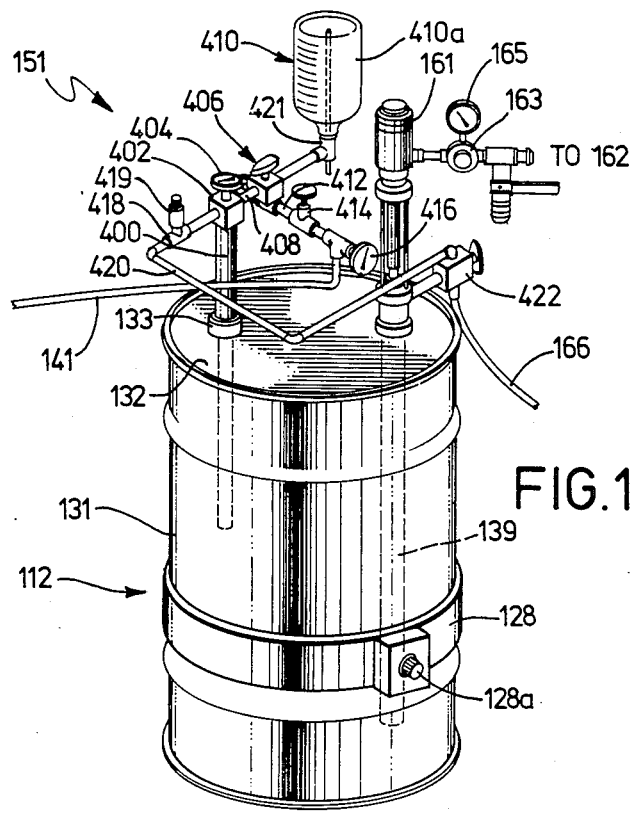
FIG.13
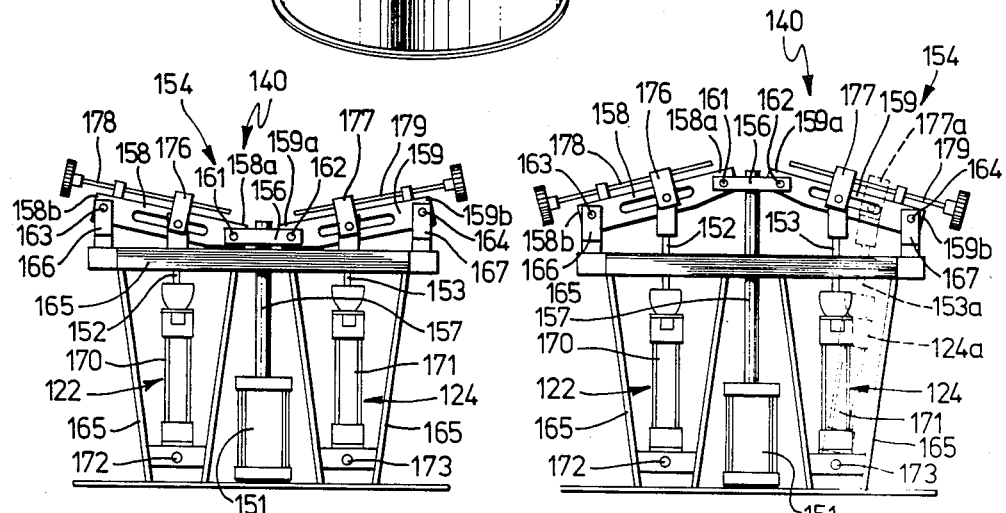
FIG.14A
FIG.14B

PLURAL COMPONENT APPLICATION SYSTEM

This application is a continuation-in-part of application Ser. No. 06/744,280 filed June 13, 1985, now abandoned.

BACKGROUND OF THE INVENTION

The present invention relates to a method and apparatus for manufacturing plural component materials and, more particularly, to a method and apparatus for forming rigid urethane structures from reactive components.

Urethane elastomer materials are commonly manufactured by combining a first reactive component, such as isocyanate, with a second reactive component, such as polyol resin. Each of the components is, by itself, generally stable if properly stored; however, when they are mixed under the proper conditions, they initiate a chemical reaction that causes the components to polymerize and form the urethane structure.

Usually, cross-linking and curing of the plural component urethane materials are substantially completed in a matter of minutes. Therefore, it is not practical to mix the components in advance and then apply the mixture from a conventional dispensing device since the components would tend to cross-link and cure before dispensing could be effected. Accordingly, it is necessary to maintain the components separate from one another until the last possible moment and to mix them in the dispensing device itself as close as possible to the location where the mixture is to be dispensed from the device.

One current system especially developed to process reactive urethane components comprises a hand-sprayed rim (reaction-injection molding) machine designed to operate at high pressures of from about 1400–1600 psi.

Basically, this equipment includes an isocyanate supply tank and a polyol supply tank for storing supplies of the components to be mixed. A transfer pump is connected to the output of each tank to transfer the components to proportioning pumps which, in turn, are provided to deliver each component to a mixing and dispensing device (i.e., a spray gun) at the desired rate. Each tank is provided with a tank heater to initially heat the components to the desired temperatures for effective polymerization and to maintain the materials at the proper viscosities for reliable flow of the components through the system.

The proportioning pumps are hydraulically operated reciprocating pumps and function to deliver the components to the spray gun to be mixed therein in the correct proportion. From the proportioning pumps, the components flow through heat exchangers and heated hoses to the spray gun. Heating of the components within the hoses is necessary to ensure that the components are maintained at the proper temperatures inasmuch as during normal operation of the system, component materials may remain in the hoses for substantial periods of time between dispensing operations and, thus, could cool significantly if the hose heaters are not provided.

In the spray gun, the components are mixed together and ejected from the outlet orifice of the spray gun. High-pressure air helps to atomize the mixed components and assists in cleaning the mixture from the spray gun.

Although the currently known equipment, as described above, is generally effective and reliable in manufacturing rigid urethane elastomer structures, it is not fully satisfactory for a number of reasons.

The system's means to deliver the plural components to the spray gun is costly and includes independently operating hydraulic drive means for the pumps and independently controlled heated hoses leading from the pumps to the spray gun. The delivery ratios and the delivery temperatures of the two components are thus subject to variation, requiring close attention of the operator. For example, the temperature and viscosity of the components reaching the spray gun are each dependent upon the time they reside within the heated hoses, which is dependent upon the spray gun operator, the heated hose controls, and pump drives. Furthermore, the proportioning pumps are both costly and relatively complex and require complete hydraulic power systems including oil pumps and complete oil-circulating systems to drive the proportioning pumps.

The system also includes separate, storage tanks for storing relatively small quantities, e.g., five to fifteen gallons, of isocyanate and polyol resin. These tanks increase the cost of the system and must be periodically refilled from 55-gallon drums in which the materials are normally shipped and stored.

In addition, the system requires a plurality of heating apparatus and controls including storage tank heaters to initially heat the components within the storage tanks, heat exchangers in the fluid delivery system to heat the components to the desired temperature to be delivered to the mixing and dispensing device, and heated hoses in both the isocyanate and polyol lines to maintain the components at the proper temperatures during periods when they remain within the hoses between dispensing operations.

Thus the system is complex and costly and subject to variability in performance due to its operation by an operator and variance in the operation of its components.

SUMMARY OF THE INVENTION

The invention provides a simplified, inexpensive system with substantially fewer components and improved operability. The system of the invention substantially eliminates variability in the temperature and viscosity of the plural components being sprayed due to variation in operation of the spray gun by the operator and in operation of system components and unreliability due to operator inattention to the operation of the component delivery means of the system.

The system of the present invention includes a first source of a first component, e.g., isocyanate; a second source of a second component, e.g., polyol resin; a mixing and dispensing device such as a spray gun; and an improved and simplified system for supplying the components to the mixing and dispensing device.

The supply system comprises first and second delivery systems for delivering the first and second components from the first and second sources, respectively, to the mixing and dispensing device, and for returning the first and second components back from the mixing and dispensing device to the first and second sources, respectively. Thus, the delivery system provides for a continuous recirculation of the components through the system irrespective of whether or not the mixing and dispensing device is being operated. When the mixing and dispensing device is actuated by an operator, the components will simply be directed from the continuously recirculating delivery systems into the mixing and dispensing device for as long as the mixing and dispensing device continues to be operated.

Because the components continuously recirculate through the system, the heated hoses and controls required in current systems can be eliminated; and recirculation, in conjunction with means to heat the two materials, is sufficient to maintain the components at the desired temperatures for delivery to the mixing and dispensing device.

In addition, the supply system includes improved and simplified pumping systems for pumping the first and second components through the first and second delivery systems to the mixing and dispensing device. The pumping system comprises a first positive displacement pump in the first delivery system for delivering the first component to the mixing and dispensing device, a second positive displacement pump in the second delivery system for delivering the second component to the mixing and dispensing device, and a common drive means for simultaneously driving said first and second positive displacement pumps while achieving independently adjustable component flow rates.

Preferably, the positive displacement pumps comprise piston pumps; and the drive means comprises a single, air-driven, reciprocating piston motor coupled to the first and second piston pumps by a linkage mechanism such that the first and second piston pumps will be simultaneously driven into reciprocation by the reciprocating piston motor. The linkage mechanism includes adjustment means for independently adjusting the coupling between the linkage mechanism and the piston pumps to independently control the stroke length of each piston pump to independently adjust the flow of the first and second components in the first and second delivery systems.

The pumping system of the present invention requires only a single, low-cost, air-driven, piston motor and a linkage mechanism to simultaneously drive the two piston pumps while permitting independent adjustment of the rate of component flow through the first and second delivery systems. Independently hydraulically operated proportioning pumps for each of the components and their required hydraulic power systems are eliminated, resulting in a more reliable, less complex, and lower cost system. Since a single motor drives both pumps, the possibility of variance due to independent drive means is also eliminated.

Some materials do not handle well with high and varying pressures, and with such materials the positive displacement pumps are preferably vane pumps. These pumps operate in a continuous manner and are controllable to maintain constant, unfluctuating pressures in the delivery systems. This produces controllable and uniform spray patterns and more uniformly sized component mixture particles at the outlet of the mixing and dispensing device which permits the manufacture of rigid urethane structures having improved properties.

The vane pumps are preferably connected to a common drive shaft driven by a single, constant-speed, electric motor as the common drive means, which substantially simplifies the system by completely eliminating the hydraulic drives required in current systems.

The system using vane pumps can operate at relatively low pressure (250-500 psi) as compared with prior systems and does not use the pressurized air to assist in dispensing the reactive component mixture. This permits relatively large, wet, uniform-sized particles, e.g., average particle diameter of 0.032 inch to 0.080 inch, of component mixture to be dispensed by the mixing and dispensing device which, in turn, reduces the entrapment of air by the particles and more uniformly wets and incorporates reinforcing fibers into a rigid structure.

In the invention, the first and second component sources comprise the standard 55-gallon drums in which the components are normally shipped and stored. Transfer pumps are mounted directly to the drums to transfer the components to the positive displacement delivery pumps, and conventional drum heaters are mounted to the drums to control the component viscosity by maintaining the components at desired temperatures within the drums.

Use of the 55-gallon drums in the system as the first and second component sources can eliminate the separate storage tanks provided in prior systems, further reducing the cost of the system, although accumulators are preferred in the system to ensure a supply of the components adjacent the proportioning pumps. The attention of the operator to separate, smaller storage tanks can also be eliminated, eliminating a source of operating problems due to operator inattention.

In the invention, delivery control and calibration means permit, adjacent the 55-gallon drums that are the source of the components, isolation of the first and second component sources from the atmosphere, accurate calibration of the flow rates and mixing ratios and temperature and pressure monitoring of the components at the mixing and dispensing means, and recirculation of the components prior to start-up to elevate and stabilize their temperatures.

The system also includes a chopper for dispensing fibers such as fiberglass into the component mixture being sprayed. The chopper is designed to dispense structure-reinforcing lengths of fiber to strengthen the urethane structure. The improved component delivery means of the invention permits the system to provide spray particles which "wet" the structure-reinforcing lengths of glass fibers, causing the fibers to be uniformly incorporated into the structure. Control means are provided to automatically operate the chopper whenever the mixing and dispensing device is operated.

The plural component application system of the present invention is simpler, less expensive and more reliably and easily operated than prior systems; and further specific features of the invention will become apparent hereinafter in conjunction with the following detailed description of the invention.

BRIEF DESCRIPTION OF THE DRAWINGS

FIG. 3 is a cross-sectional view of a fiber-reinforced rigid structure produced using a system of the invention;

FIG. 4 is a partial cross-sectional view of a component supply source incorporated in the system of FIGS. 1 and 2;

FIGS. 5A and 5B are schematic diagrams provided to explain the operation of the pumping system of FIG. 5;

FIG. 6 is a cross-sectional side view of the mixing and dispensing device in the system of FIGS. 1 and 2;

FIG. 7 is a top view of the mixing and dispensing device of FIG. 6;

FIG. 8 is a cross-sectional view of the mixing chamber provided to help illustrate the operation of the mixing and dispensing device of FIG. 6;

FIG. 9 is an enlarged view of a feature of the mixing and dispensing device of FIG. 6;

FIG. 10A schematically illustrates the operation of the chopper employed in the system of FIGS. 1 and 2;

FIG. 13 is a perspective view of a component supply source incorporated in the system of FIGS. 11 and 12;

FIGS. 14A and 14B illustrate the delivery pumping system of FIGS. 11 and 12 with the piston motor drive rod in retracted and extended positions, respectively.

DETAILED DESCRIPTION OF PREFERRED EMBODIMENTS OF THE INVENTION

Figure 1:
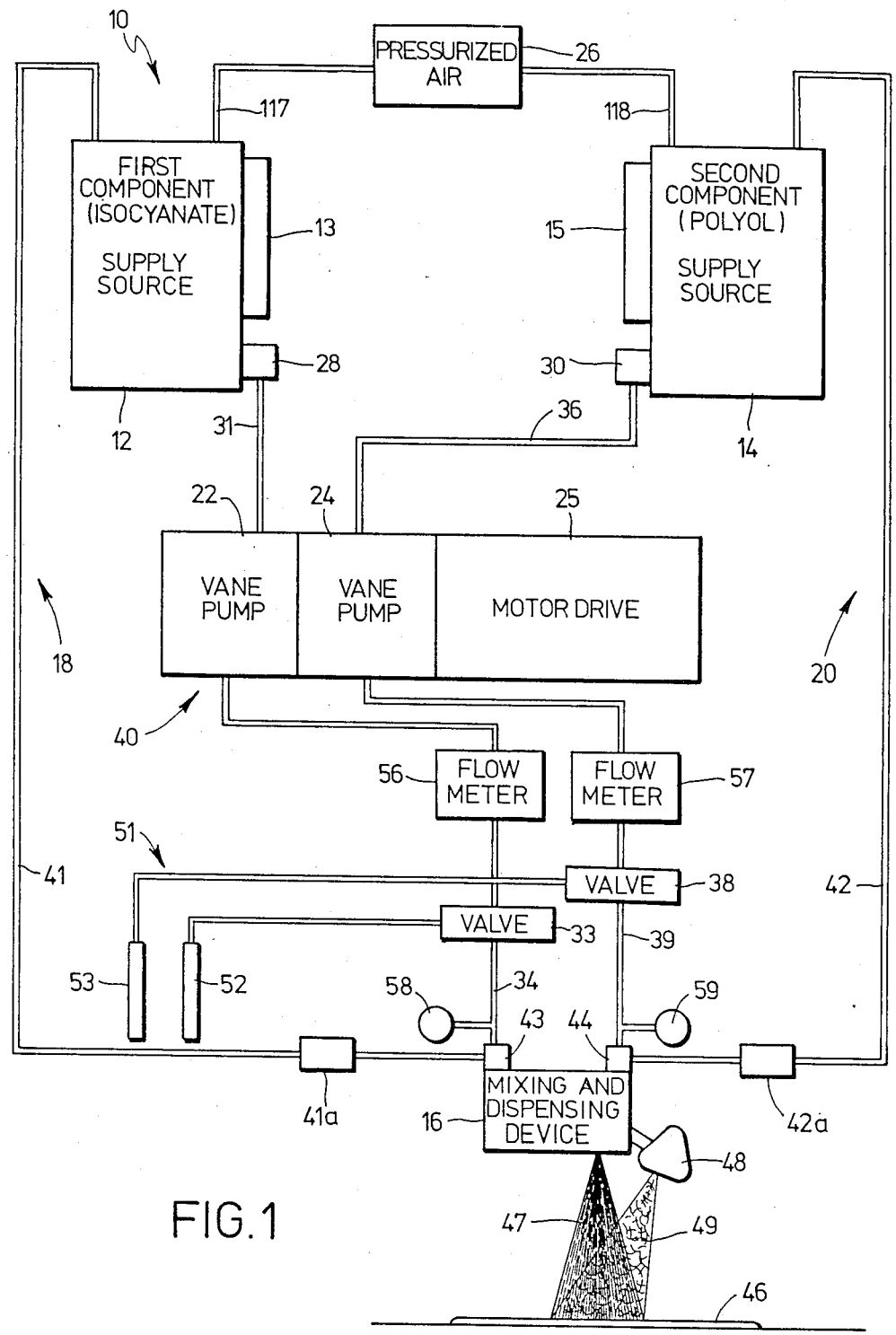
FIG. 1 is a schematic block diagram of a plural component application system of the invention.
Figure 2:
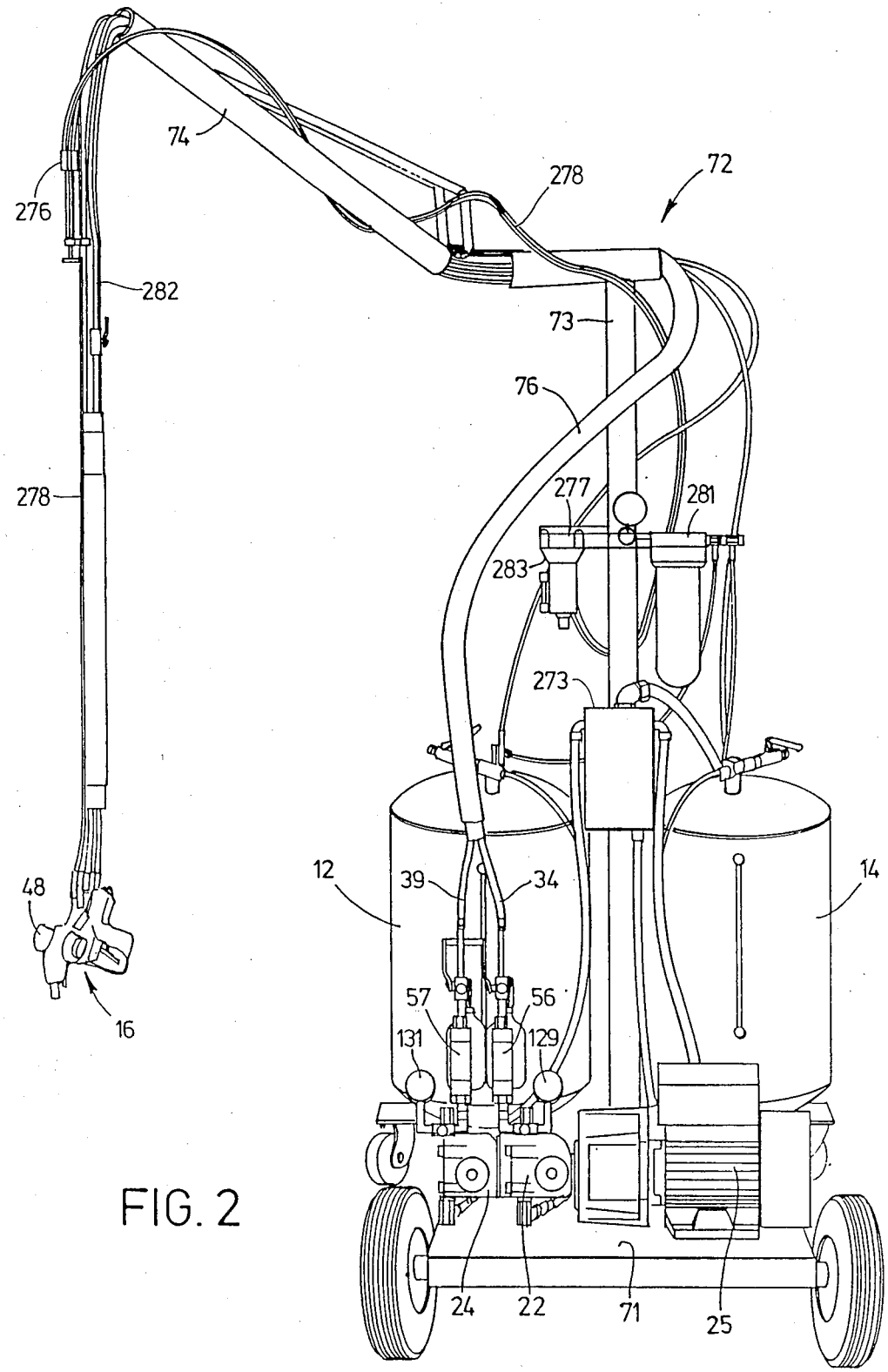
FIG. 2 is a perspective view of the plural component application system.

FIGS. 1 and 2 illustrate a plural component application system according to a presently preferred embodiment of the invention with FIG. 1 illustrating the system in schematic block diagram form and FIG. 2 illustrating a perspective view of the system.

The overall system is generally designated by reference numeral 10 and has been specifically designed to manufacture rigid, reinforced, urethane structures and, accordingly, is described herein for use in such an application.

The system includes a first component source 12 for storing a supply of a first component, e.g., liquid isocyanate, and a second component source 14 for storing a supply of a second component, e.g., liquid polyol resin. As is known to those skilled in the art, isocyanate and polyol will, under proper conditions, react when combined to form a solid urethane material. Because, however, the urethane will fully cross-link and cure within a matter of only a few minutes after the components are brought together, it is necessary that the components be isolated from one another until just before they are to be dispensed from a mixing and dispensing device. The system also includes a mixing and dispensing device 16 within which the two components are finally brought together, mixed and from which the mixture is dispensed.

A supply system connects the component sources 12 and 14 to the mixing and dispensing device 16 and includes first and second component delivery systems 18 and 20, respectively, which include pumps 22 and 24, respectively, driven by a common drive 25 for delivering the components from the sources to the mixing and dispensing device 16. Pumps 22 and 24 and their associated drive 25 are generally designated by reference numeral 40.

Each component source 12 and 14 may be connected to a source 26 of dry, pressurized air to prevent the entry of water vapor into the component sources. Each component source also includes a heating means 28 and 30, respectively, for maintaining the components at the desired temperatures. Each component source includes a sight gauge, 13, 15, to display the liquid level in each source.

First component delivery system 18 includes a conduit 31 connecting the output of first source 12 to the input of pump 22, while the output of pump 22 is connected to mixing and dispensing device 16 via a conduit 34. A return conduit 41 returns the first component from the mixing and dispensing device back to source 12 through an on-off ball valve 41a to provide a closed loop delivery system for recirculating the first component from source 12 to the mixing and dispensing device 16 and back to the source 12. By turning valve 41a "off," the entire output of pump 22 flows from the mixing and dispensing device 16.

Similarly, second component delivery system 20 includes conduit 36 connecting the output of second source 14 to the input of pump 24, conduit 39 connecting the output of pump 24 to mixing and dispensing device 16, return conduit 42 for returning the second component from the mixing and dispensing device 16 to second source 14, and on-off ball valve 42a which can close return conduit 42 and direct the entire output of pump 24 from the mixing and dispensing device 16.

It should be noted that component delivery systems 18 and 20 are totally separate from one another such that the first and second components circulating through their respective systems will not come into contact with one another and will be maintained isolated from one another.

Mixing and dispensing device 16, which is described in detail below, comprises a hand-spray gun which carries all the controls that are necessary to operate once the system is set up. For example, a trigger thereon simultaneously operates internal valve means, schematically represented in FIG. 1 by elements 43 and 44, to permit the first and second components in component delivery systems 18 and 20, respectively, to flow into a mixing chamber within the spray gun. The first and second components are thoroughly mixed, and the mixture is dispensed through an outlet orifice in the gun onto a substrate 46. As will also be explained below, the mixture is preferably dispensed in the form of a relatively flat, elongated spray pattern 47; and if desired, a chopper 48 can be mounted to the mixing and dispensing device 16 to dispense reinforcing glass fibers 49 into the spray pattern 47 to be incorporated into the urethane structure being manufactured.

The system of the present invention also includes a calibration system, generally designated by reference numeral 51, to assist in its setup. As will also be described more fully, calibration system 51 includes a pair of sample containers 52 and 53 coupled to the outputs of pumps 22 and 24, respectively, via valves 33 and 38, respectively, and permits calibration of the flow of components within delivery systems 18 and 20 so that when the mixing and dispensing device is operated, the components will be mixed in the proportions required for the particular application in which the system is to be used.

Also included in the system are appropriate monitors including flow meters 56 and 57, preferably located in pump output conduits 34 and 39, respectively, and temperature gauges 58 and 59, preferably located adjacent the mixing and dispensing device, to monitor the flow rates and temperatures in component delivery systems 18 and 20, respectively.

As shown in FIG. 2, substantially the entire system illustrated in FIG. 1 is adapted to be supported on a wheeled base 71 so that it may be easily moved from location to location for use. A mast and boom assembly 72, including a mast 73 and a boom 74, extends upwardly and outwardly from the base 71 and supports the various conduits 34, 39, 41, and 42 leading to and from the mixing and dispensing device 16 and the several air lines leading to the mixing and dispensing device 16 as will be described. At least the boom 74 is preferably constructed to have a variable extent, for example, hinged and folding, so that it may be extended outwardly to the desired length for most convenient use.

The various fluid and air conduits in the system are preferably constructed of materials that are chemically inert to the component materials and that are flexible in nature so as to permit substantially unencumbered movement of the dispensing device 16 mounted to the ends of the various conduits during use. The conduits are preferably nylon or include a nylon inner tubing. Substantial portions of the conduits are also enclosed within a flexible sleeve 76 to protect the conduits from rubbing up against the mast and boom and to prevent them from becoming entangled in one another.

FIG. 3 is a cross-sectional view of a urethane elastomer structure which can be manufactured according to the present invention utilizing the system of the invention. The structure, generally designed by reference numeral 81, is formed by applying the mixture of the first and second components, i.e., isocyanate and polyol resin, onto a substrate, e.g., substrate 46 in FIG. 1. Typically, substrate 46 will comprise a mold surface used to define the shape of the urethane structure to be formed. After the material has become fully cross-linked and cured, the structure 81 may be removed from the mold for further processing as is known to those skilled in the art. The structure can be made of any desired thickness and shape, depending on the particular application with which it is to be used.

Also illustrated in FIG. 3 are a large number of fibers 49 of structure-reinforcing length incorporated into the urethane structure. This is accomplished by dispensing the fibers into the component mixture spray 47, as shown in FIG. 1, using chopper 48. It is known to embed fibers of glass or other materials into urethane elastomers, such fibers are used primarily as a filler only and are very short in length, for example, ¼ inch or less. With some plural component materials, the application of mixed components as a spray with a mass-to-surface ratio within a preferred range maintains sufficient "wetness" of the spray particles that they can effectively bond with and interconnect the structure-reinforcing fibers and reduce the likelihood of entrapped air in the resulting structure. With some components, a preferred mass-to-surface ratio corresponds with a spray having an average particle diameter within the range of about 0.032 inch to about 0.080 inch, with a spray with an average particle diameter of 0.050 inch being representative of satisfactory operation.

FIG. 4 is a partial cross-sectional view of first component source 12. Second component source 14 is substantially identical in construction and, therefore, will not be described.

Source 12 comprises a storage vessel or tank 101 which should be formed of or lined with a material that is chemically inert with respect to the component which it will receive; e.g., isocyanate. Typically, tank 12 will be constructed of a metal such as aluminum, aluminum alloy, stainless steel, etc., although other materials can also be used, if desired. Tank 101 can vary in size, but is preferably capable of holding at least about five to ten gallons of liquid component. A sight gauge 13 can be provided, if desired, to indicate the level of component in the tank at any particular time.

Tank 101 includes a pair of component inlet ports 103 and 104 adjacent its top end through which the isocyanate may be placed in the tank. Inlet port 103 can conveniently be used to recirculate isocyanate into the tank from return conduit 41 (FIG. 1), while inlet port 104 can be used to supply the tank with additional amounts of isocyanate (e.g., from a 55-gallon drum) to maintain the level of the component in the tank at an adequate level during operation of the system.

As illustrated in FIG. 4, fluid entering into the tank through inlet ports 103 or 104 is directed toward the sidewall of the tank by curved deflectors 106 and 107, respectively, to reduce the entrapment of air within the fluid. Inlet port 104 should be closed, for example, by a cap 108 when not in use to prevent contamination of the isocyanate.

A component outlet port 109 is provided in the sidewall of the tank adjacent the bottom end thereof. Mounted to outlet port 109 is a coupling 111 for coupling the outlet port 109 to conduit 31 to connect the tank to pump 22 (FIG. 1). In addition, coupling 111 supports the heating means 28, which preferably comprises an immersion heater 110 which extends into the tank and is provided to maintain the isocyanate in the tank and in the system in general at the desired temperature. Typically, both the isocyanate and the polyol will be maintained at a temperature of about 130° F. A heater control 112 is mounted to the coupling externally of tank 101 to permit the temperature of the isocyanate to be properly controlled. A suitable immersion-type heater that can be used in the present system is the 2,000-watt heater manufactured by Watlow Electric Mfg. Co. of St. Louis, Mo., their Model No. BGS 71756, but other similar heaters can be used.

Tank 101 also includes an inlet port 116 in its top to be connected to pressurized air source 26 via line 117 as shown in FIG. 1. The polyol tank is similarly coupled to source 26 via line 118 as shown in FIG. 1. The pressurization of sources 12 and 14 with dry air will preclude the entry of water vapor into sources 12 and 14 and preclude contamination of the first and second components. The air source structure will be discussed more fully below in conjunction with FIG. 10. A further outlet port 119 is provided in the bottom of the tank for draining the tank and for general maintenance purposes. Finally, the tank is provided with suitable legs 121 for supporting the tank on wheeled base 71 (FIG. 2). As indicated above, source 14 has a structure identical to that described above for source 12.

Figure 5:
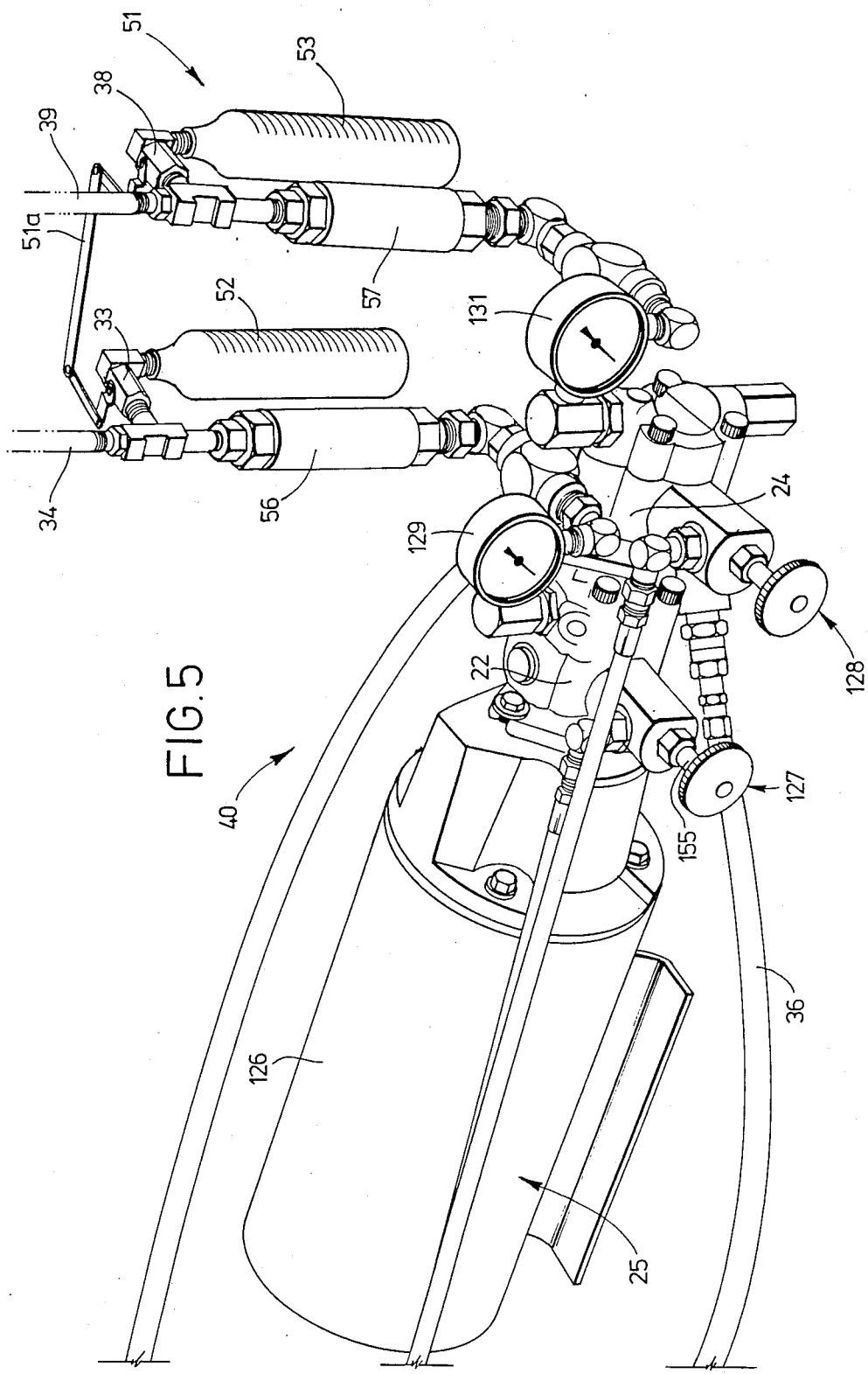
FIG. 5 illustrates the pumping system included in the system of FIGS. 1 and 2.

FIG. 5 illustrates the pumping system 40 that is incorporated into the system of FIGS. 1 and 2. As previously described, pumping system 40 includes a first pump 22 for pumping the first component around the first delivery system 18 and a second pump 24 for pumping the second component around the second delivery system 20.

In the invention, pumps 22 and 24 can comprise positive displacement vane pumps coupled in ganged relationship so as to be driven by a common drive 25.

A vane pump is a device in which a plurality of vanes are mounted to a rotor such that rotation of the vanes will urge a fluid to flow therethrough. Such pumps are capable of maintaining a constant, unfluctuating pressure which is used in the present invention to obtain a urethane elastomer structure of improved physical characteristics and to provide a number of other important advantages.

In the invention, the rotors of each vane pump are mounted to a common rotating shaft and driven by a single constant speed electric motor 126. A vane pump that is suitable for use in the present invention is manufactured by Continental Hydraulics of Savage, Minn., a division of Continental Machines, Inc., their Model PVR6-8815-RF. Such pumps should have a capacity of two to eight gallons per minute in the system of this invention.

By using positive displacement vane pumps, in conjunction with continuously circulating component delivery systems, substantially constant and readily controllable fluid temperature and pressure are obtained which produce a substantially more uniform spray from the mixing and dispensing device with particle sizes having mass-to-surface ratios to provide improved properties for the resulting urethane structure.

The vane pumps are adapted to operate continuously during system operation; and the first and second components continuously circulate through the system whether or not the mixing and dispensing device is being operated, thereby maintaining the entire fluid system at a substantially constant temperature. Since the viscosities of the urethane components are sensitive and vàriable with temperature, the maintenance of substantially constant temperatures is a significant improvement, particularly without the problem of heated temperature-controlled hoses.

The use of electrically driven vane pumps also eliminates the hydraulic power source to drive reciprocating hydraulic pumps and eliminates the need to change pumps when pumping different materials through the system or when a different pumping pressure or flow rate is required. The mechanical drive apparatus normally required in hydraulic pumping systems, including chains, gears, etc., is also eliminated as well.

The vane pumps, although driven together by a constant speed electric motor, are capable of being independently adjusted to control the pumping pressure in each fluid delivery system 18 and 20. Typically, when producing urethane structures, the isocyanate and the polyol are mixed in a 1:1 ratio. The materials, however, do not have the same viscosity and specific gravity, and, therefore, these components should be pumped into the mixing chamber of the mixing and dispensing device 16 at somewhat different rates. Accordingly, it is desirable to adjust pumping pressures in the two fluid delivery systems and to provide different rates of flow from the pumps to achieve uniform mixing of the components. Such an adjustment can avoid an initial and transient imbalance of flow upon triggering the mixing and dispensing device 16. Such an operation was not possible in prior systems using reciprocating pumps because variable volume flow could be achieved only by changing the cylinder diameter of one of the pumps. This can easily be accomplished by adjusting the operating adjustments 127*a* and 128*a*, and 127*b* and 128*b* (not shown in FIG. 5) coupled to the rotor housing of each pump.

More specifically, although vane pumps are well-known devices which need not be described in any significant detail herein, for clarity, their operation is briefly described herein with reference to FIGS. 5A and 5B which are schematic, cross-sectional views of the interior of a vane pump (e.g., vane pump 22).

In FIGS. 5A and 5B, reference numeral 151 identifies the common drive shaft shared by the two pumps 22 and 24 and driven into rotation by drive means 126. Rotor 152 is coupled to the shaft for rotation therewith and has a plurality of vanes 153 extending outwardly therefrom. The rotor and vanes are positioned within a cylindrical element 154, and the cylindrical element is capable of being moved laterally (i.e., up and down in FIGS. 5A and 5B) relative to the rotor and vanes. A screw 127*b* is provided in pump housing 156 and bears on one side of the cylindrical element 154. A spring-loaded follower 155*b* is urged against the cylindrical element 154 by a compression spring 155*a* and adjusting screw 155 which is also provided in the pump housing 156. Screw 127*b* provides adjustment for the rate of flow from the pump, and screw 155 provides adjustment of the pump output pressure.

When the flow adjustment screw 127*b* is adjusted to place the housing 154 in the position shown in FIG. 5A with the rotor 152 centered within the housing, fluid will merely circulate within the pump; and the pump vanes will not urge flow through the pump When, however, the flow adjustment screw 127*b* is adjusted to move the housing 154 laterally (downwardly as shown in FIG. 5B) so that the rotor will be eccentrically positioned within the housing, fluid will be urged through passageway 157. Thus, by adjusting the position of flow adjustment screw 127*b*, the degree of eccentricity between the rotating vanes and the surrounding cylindrical element 154 can be adjusted to vary the flow rate. By adjusting screw 155, the spring 155*a* can be compressed to increase and control the pressure through its elastic support of the cylindrical element 154. This pump pressure control system, generally designated as 127*a*, permits a relatively constant pump output pressure and provides a pressure relief system. Such a pumping system is incorporated into the Model PVR6-8B15-RF pump of Continental Hydraulics.

With a vane-pumping system as employed in the present invention, pressure/volume settings are predictable with temperature which is not true of fixed displacement pumps. The operating pressures of pumps 22 and 24 can be monitored with meters 129 and 130, respectively; and the flow rates can be monitored with flow meters 56 and 47.

In order to set the flow rate of each component through its respective delivery system at the desired rate, the present invention provides a means 51 for calibrating the systems. More particularly, with reference again to FIG. 1, calibration apparatus 51 comprises a pair of calibrated delivery sample containers 52 and 53 connected to the outputs of pumps 22 and 24, respectively, via control valves 33 and 38, respectively. Preferably, at the beginning of each working day, or whenever component materials are changed to manufacture different structures, the valves 33 and 38 should be actuated to allow component fluid leaving pumps 22 and 24 to flow into containers 52 and 53, respectively. Where the control valves 33 and 38 are to be actuated by hand, the actuators of both valves can be connected together by a common operator 51*a* (FIG. 5) so that they may be operated simultaneously. Each component is allowed to flow into its respective calibrated container for a controlled time duration so that the flow of the components will be directed into their respective containers for the same time period. Accordingly, the rates of flow of each component in it respective delivery system can be calibrated and the pumps adjusted, if necessary, to achieve the desired relative flow rates of the two components in their respective delivery systems After the controlled calibration period has been completed, valves 33 and 38 can again be actuated to close off containers 52 and 53 and to remove the calibration apparatus 51 from the fluid delivery systems.

As will be described hereinafter, the calibration apparatus is preferably controlled from a control box mounted on wheeled base 71.

Flow meters 56 and 57 in the component delivery systems 18 and 20, respectively, permit the flow rates of each component to thereafter be monitored at all times to insure proper operation of the system.

FIGS. 6-10 illustrate the mixing and dispensing device 16 in greater detail. Mixing and dispensing device 16 essentially comprises a hand-held spray gun 200 designed to receive and mix a plurality of components and then dispense the mixture through an outlet orifice 201 upon operation of a trigger 202. The spray gun is a modified version of the spray gun described in U.S. Pat. No. 3,799,403 and includes a housing or barrel 203 and a handle 204 extending from the barrel at an angle with respect thereto The barrel, handle, trigger, and other parts of the gun may be fabricated from any suitable wear-resistant material that is chemically inert with respect to the first and second components or to the compound which results from the components being mixed. A suitable material is metal including aluminum, aluminum alloys and steel, or plastic such as acetal resin, epoxy and glass-filled nylon. A guard 206 extends between the housing and the base of handle 204 to help prevent accidental actuation of the trigger.

The gun is adapted to be connected to the component delivery systems 18 and 20 by connections 207 and 208 (FIG. 7) positioned near the forward end of the gun. More particularly, connections 207 and 208 are provided with fittings 209, 210, respectively, adapted to be coupled to complementary fittings (one complementary fitting 211 is visible in FIG. 10) to which the component lines 34, 39, 41, and 42 are connected. More specifically, in FIG. 10, fitting 209 is coupled to fitting 211. Fluid line 34 carrying the first component (isocyanate) to the gun and fluid line 41 carrying the first component from the gun back to supply source 12 are both connected to fitting 211 so as to permit the continuous circulating flow of the first component around the first delivery system 18. Although not completely illustrated in the Figures, a similar fitting is used to connect lines 39 and 42 of second component delivery system 20 to fitting 210 and connection 208 (FIG. 7) so as to permit the second component (polyol) to recirculate through the second delivery system 20.

Under normal conditions, when the gun 200 is not in use and when trigger 202 is not depressed, the first and second components will simply recirculate through their respective component delivery systems; and neither of the components will enter into the gun itself to be dispensed. Upon depressing the trigger 202, however, valve means within the gun (schematically identified as elements 43 and 44 in FIG. 1) will be actuated to allow the components to enter into the gun body 203 through fittings 209 and 210 to be mixed and dispensed. If advisable, the on-off valves 41a and 42a can be turned off so that the return flows of the components through conduits 41 and 42 are blocked.

Means 212 (FIGS. 7 and 8) defines a mixing chamber 215 within which the two components are mixed prior to being dispensed. An enlarged portion of means 212 defines two, flat, smooth surfaces 213, each of which includes an aperture 214 which intersects the bore-shaped mixing chamber 215 shown in FIG. 8. The flat, smooth surfaces cooperate with sealing means 216 carried by connections 207 and 208 to block the flow of components from the component delivery systems 18 and 20 through fluid passages 217 and 218 in fittings 209 and 210 into the mixing chamber 215 when the gun is not being operated. More particularly, when trigger 202 is not being depressed, the means 212 defining mixing chamber 215 will be positioned forwardly within the gun substantially as indicated in FIG. 6; and apertures 214 will not be aligned with passages 217 and 218. Accordingly, the components will be prevented from flowing into the mixing chamber 215 by the surfaces 213. When, however, the trigger is depressed, means 212 will be caused to move rearwardly within the gun body 203 to align apertures 214 with passages 217 and 218 to permit the components to flow into mixing chamber 215.

Figure 10:
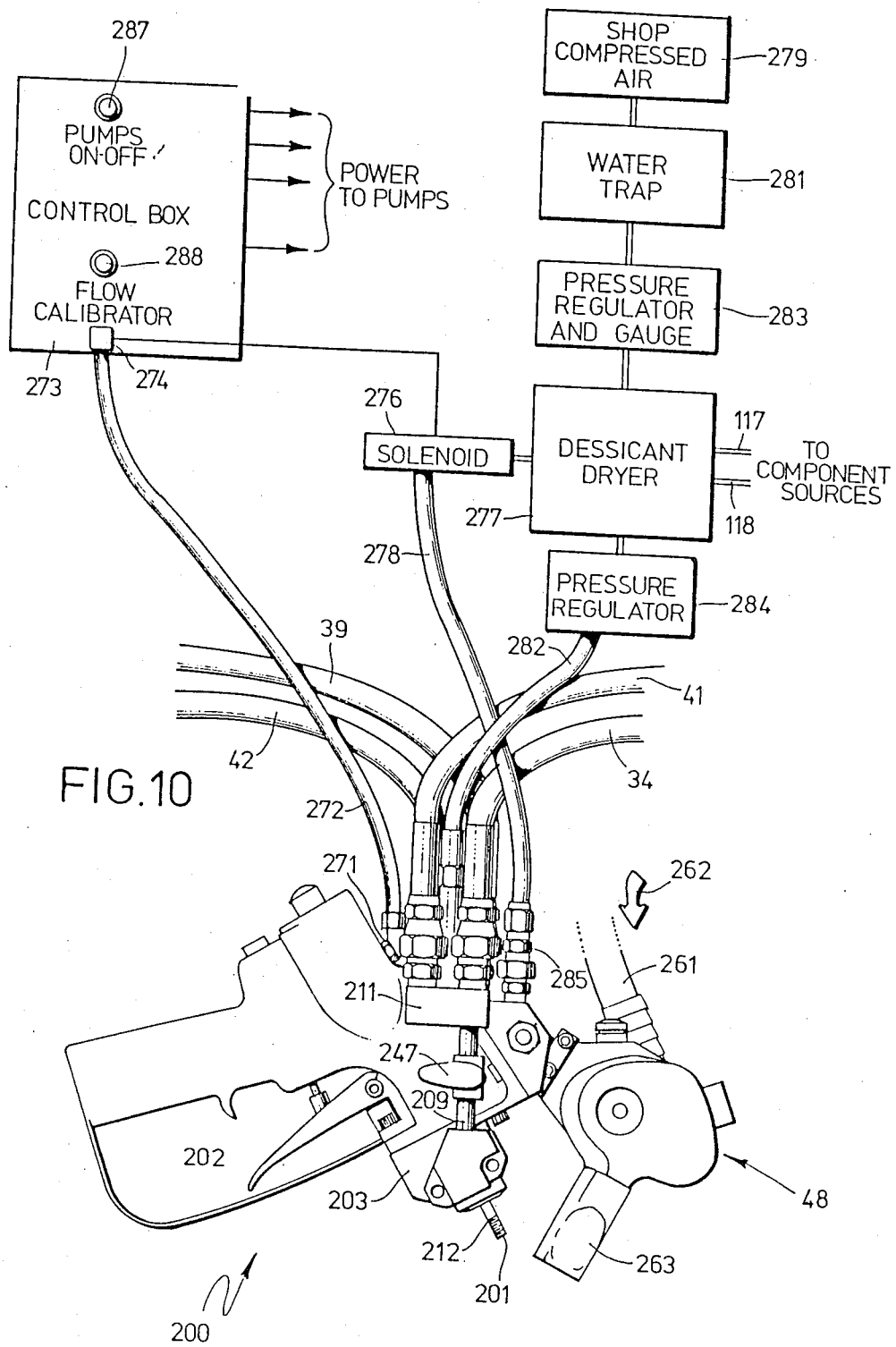
FIG. 10 schematically illustrates the overall system control for the system of the mixing and dispensing device of FIG. 6.

As can be seen in FIGS. 7 and 10, fittings 209 and 210 project upwardly and rearwardly from the body of the gun so that the various conduits carrying the components to and away from the gun will be carried by the gun over the handle and out of the way of the operator. Likewise, fitting 221, which is adapted to be coupled to a source of pressurized air, and the other fittings to be described hereinafter are positioned to be out of the way of the operator as much as possible.

The compressed air delivered to gun 200 through fitting 221 is put to several uses. Initially, compressed air flows from fitting 221 through passageway 222 which intersects with passageway 223 formed within body 203. Passageway 223 connects with a passageway (not shown) which leads to four-way valve 224 operated by the trigger 202. When trigger 202 is depressed, compressed air will flow through passageways 222 and 223 into the four-way valve 224 and be delivered into cylinder 226 forwardly of piston 227 through passageway 228. The compressed air in cylinder 226 forces piston 227 rearwardly against the force of spring 228. The air in cylinder 226 rearwardly of piston 227 is exhausted through passageway 229 and through four-way valve 224 into passageway 231 in the handle 204.

Piston 227 is connected to means 212, defining mixing chamber 215 by a rod 232; and accordingly, when piston 227 is forced rearwardly upon depression of the trigger, means 212 is also forced rearwardly to align apertures 214 with passageways 217 and 218 to permit the components to flow into mixing chamber 215. Due to the pressures within the component delivery systems, component material will rapidly flow into chamber 215, be thoroughly mixed and agitated therein, and the mixed components rapidly expelled from the mixing chamber through outlet orifice 201 to form spray pattern 47 as shown in FIG. 1. Where the system is adjusted as set forth above, the components are uniformly mixed in the desired ratios.

The component mixture will continue to be sprayed by the gun for so long as the trigger 202 is depressed. Upon release of the trigger, spring 230 causes the trigger to return to its original position. Four-way valve 224 then permits the air in cylinder 226 forwardly of piston 227 to be exhausted through passageway 228, the valve 224, and passageway 233. This permits spring 228 to return the piston 227 and the mixing chamber defining means 212 connected thereto to their forward position in the gun at which position the component materials are again blocked by surfaces 213 from entering into the mixing chamber 215.

After the trigger is released following a dispensing operation, it is necessary to purge the gun to remove any mixed component materials remaining in the gun as they will quickly react to form urethane elastomer which can clog and damage the gun. Purging is also accomplished by using compressed air entering into the gun through fitting 221. More particularly, upon the forward movement of piston 227 following the release of trigger 202, seal 241 carried by rod 232 is moved forwardly out of sealing engagement with air passageway 242, permitting pressurized air to enter into compartment 243 via passageways 222, 223, and 242. In the non-operating position shown in FIG. 6, apertures 214 are open to compartment 243, permitting pressurized air to enter into the mixing chamber 215. A seal 244 prevents the air from escaping out of the gun around the portion of means 212 that forms the outlet orifice. Thus, high-pressure air is forced into the mixing chamber 215 through apertures 214 and exits through outlet orifice 201 to effectively purge the interior of the mixing chamber of any residue component materials.

If the gun is not to be used for an extended period of time, valve 246 within fitting 221 can be closed manually to shut off the flow of compressed air into the gun. Similarly, manually operated valves 247 (one of which is shown in FIG. 10) can be operated to block flow of component materials into the gun even if the trigger is accidentally operated.

In using the system of the present invention to produce urethane structures from isocyanate and polyol, it is preferred that spray pattern 47 be a substantially flat, fan-shaped form. It has been found that such a pattern provides a more usable distribution of droplets and is more easily used by an operator to obtain a uniform application of the component mixture onto a substrate. This is preferably accomplished by providing an attachment to the gun that will form the desired spray pattern and which can easily be removed for applications in which such a pattern is not desired. The attachment is illustrated in FIG. 9.

Specifically, as shown in FIG. 9, the spray attachment, generally designated by reference numeral 250, includes a member 251 which is adapted to be screwed onto the end of mixing chamber defining means 212 which extends out the front end of the gun, as shown in FIG. 6. An outlet orifice-defining member 252 having an outlet orifice 253 shaped to provide the desired fan-shaped spray pattern is positioned over the outlet orifice 201 on the end of means 212 and is clamped in place by threaded member 253.

With spray attachment 250 in place, the component mixture passing through outlet orifice 201 will be reshaped by orifice 253 to define the desired flat fan spray pattern 47. When not needed, attachment 250 can simply be removed.

FIG. 10 schematically illustrates an overall system control of the present invention and additionally illustrates the spray gun 200, mixing and dispensing device 161, together with the chopper 48 mounted thereto. As indicated previously, the function of chopper 48 is to chop fibers, such as glass fibers, fed thereinto into lengths of greater than about ¼ inch and up to about 1 inch, and to direct the chopped fibers into the spray pattern 47 of the component mixture.

The specific structure of the chopper does not form a part of the present invention and is well-known to those in the art and, accordingly, is not described in detail herein. However, its operation is schematically illustrated in FIG. 10A. A bundle of fibers 261, for example, a bundle of glass fibers, is fed into the chopper from a supply spool (not shown) in the direction indicated by arrow 262. As it is fed into the chopper, the bundle is split into smaller groups 261a–c to permit the individual fibers to be cut more reliably by fiber cutter 301. Cutter 301 comprises a rotor 302 having a variable number of cutting blades 303 extending therefrom. Anvil rotor 308 is mounted to a drive shaft 304 driven by an air motor 306. As the fibers pass through the chopper, they are cut into desired lengths by the cutter 301; and the cut fibers are discharged through the chopper outlet 263 (FIG. 10). The fibers are fed through the chopper between a pair of rollers 307, 308, one of which (308) is driven by the air motor 306 to advance the fibers through the chopper. By adding or subtracting blades in the chopper, the length of the fibers cut from the bundle can be controlled. A typical chopper may contain variable length fibers of structure-reinforcing length by selection of the number of blades to be used. Such a chopper may be that sold by Glas-Craft, Inc., Indianapolis, Ind., by their Part No. RS 310.

As shown in FIG. 10, chopper 48 is mounted directly to the body 203 of gun 200 and is pivotally mounted to the gun body so that fiber outlet 263 can be pointed in the desired direction relative to the spray pattern emanating from the outlet orifice 201 (or orifice outlet 253 of spray attachment 259) of the gun. Preferably, the chopper is aligned such that the cut fibers 49 will enter into the flat side of the spray pattern 47 (FIG. 1) and be thoroughly and uniformly mixed therein before the spray pattern impinges upon the substrate 46.

In the invention, the chopper is designed to operate automatically whenever the spray gun 200 is operated. This is accomplished as follows. Initially, as was described previously with reference to FIG. 6, when the trigger 202 is depressed, pressurized air is allowed to enter into the gun via fitting 221. The pressurized air enters into passageways 222 and 223 and then into cylinder 226 to drive piston 227 rearwardly. In the invention, this pressurized air is tapped, for example, via passageway 228, by a fitting 271 extending into the side of the gun and connected by an air hose 272 to a control box 273 (FIG. 2). Air hose 272 is connected to a pressure-sensitive switch 274 within the control box; and when switch 274 detects an increase in pressure in line 272 (indicating that trigger 202 has been depressed), it activates solenoid control valve 276 via connection 277.

Solenoid valve 276 is connected in an air line 278 coupling the air motor 306 in the chopper 48 to an air manifold 277. Solenoid valve is preferably positioned at the end of the boom 74 (FIG. 2) to avoid delay in its operation after trigger 202 has been operated. When solenoid valve 276 is actuated, pressurized air is allowed to flow from the manifold 277 to the chopper 48 to operate the air moor 306 therein. Operation of the motor will drive roller 308 to pull fibers into the chopper and cutter 301 to cut the fibers to the desired length. When the trigger is released, the air pressure on line 272 will drop to atmospheric pressure; and switch 274 will deactivate solenoid valve 276 to block any further flow of air through line 278 from the manifold and stop operation of the chopper.

Thus, the chopper will operate whenever the trigger 202 is depressed and stop operating whenever the trigger is released so that operation of the chopper will automatically coincide with the operation of the spray gun 200.

As shown in FIG. 10, manifold 277 is connected to a supply of shop-compressed air 279. Before being utilized in the system, the air is passed though a water trap and desiccant dryer 281 to remove any water from the air. Water has a deleterious effect on the reactive urethane components. A suitable air dryer is manufactured by Wilkerson Co., Englewood, Colo., their Model No. X 03-02-000.

Air manifold 277 directs dry pressurized air to the component supply tanks 12 and 14 via lines 117 and 118, to the spray gun 200 via line 282 connected to fitting 221 (FIG. 6), and to the chopper 48 via line 278 connected to the chopper. Pressure regulators 283 and 284 are preferably incorporated to regulate the air pressure to the supply sources 12, 14 and the spray gun 200.

The control box 273, in addition to containing pressure-responsive switch 274, also provides power (via switch control 287) to the pump motor drive 25 and, as indicated previously, may control (via switch control 288) the operation of valves 33 and 38 to permit use of the calibration apparatus 51.

The operating parameters of the system of the present invention can be varied depending on the particular materials and the application for which it is to be used.

When manufacturing urethane structures from isocyanate and polyol components, the temperature of the components is maintained between 60° and 140° F. by the heaters 28 within the component supply sources 12 and 14. A temperature of about 130° F. is preferred for many materials. At this temperature, the viscosity of the components is such that they will flow smoothly through the system; and this temperature is appropriate for effective reaction of the components. Because the components are constantly recirculating through the system, it is unnecessary to provide heaters within the component-carrying conduits as in prior systems. This results in a less complex, lower cost system.

In manufacturing urethane structures with some plural component materials, low pressures are preferable. For example, at a relatively low-spray pressure of about 250 psi, the gun can be preferably provided with a mixing chamber having an outlet orifice diameter of 0.116 inch and side input apertures of 0.086 inch diameter. A flat spray attachment 250 that has an outlet orifice with a nominal size of about 0.062 inch will produce a flat fan spray pattern having a 25° included angle and particles of satisfactory size. Such operation permits particles having a large mass-to-surface ratio that will wet fibers of structure-reinforcing length and provide reliably strong structures.

When operated at a relatively higher spray pressure of about 500 psi, a mixing chamber having a nozzle diameter of 0.086 inch and side input apertures with diameters of 0.0595 inch is preferred. With this mixing chamber, a flat spray attachment having an orifice with a nominal size of 0.043 inch is preferably used to produce a spray pattern having a 40° included angle and particles of satisfactory size.

Relatively large, wet particles having mass-to-surface ratios sufficiently large that the mixed urethane components are less susceptible of retaining air are produced with some materials to sufficiently wet the lengths of reinforcing fiber and better incorporate the glass fibers into the finished urethane structure. As indicated above, such sprays generally have particles with average diameters of about 0.032 inch to about 0.080 inch.

Figure 11:
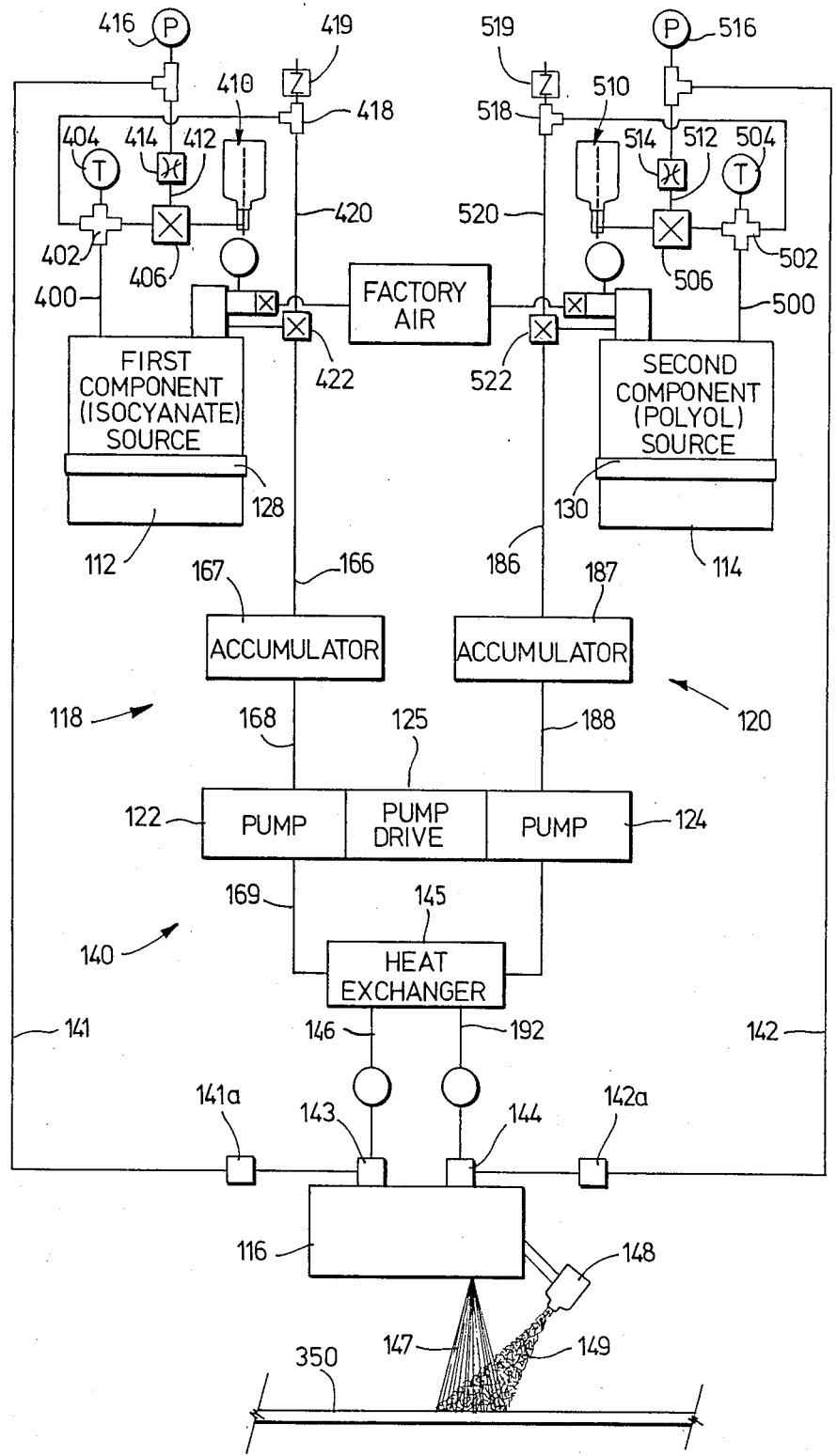
FIG. 11 is a schematic block diagram of another plural component application system embodiment of the invention.
Figure 12:
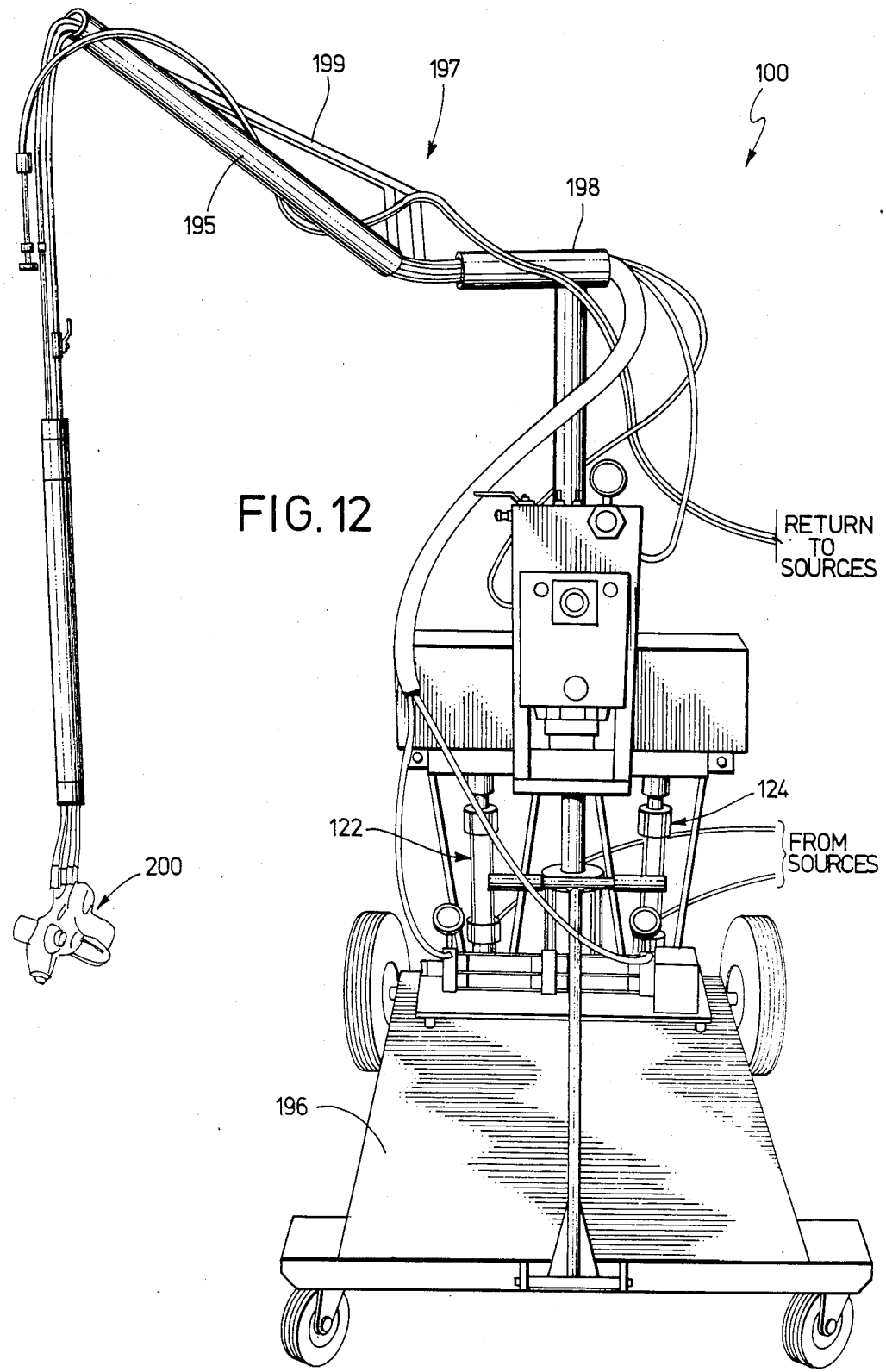
FIG. 12 is a perspective view of the plural component application system of FIG. 11.

FIGS. 11 and 12 illustrate another plural component application system of the invention, with FIG. 11 illustrating the system in schematic block diagram form and FIG. 12 illustrating a perspective view of the system.

The overall system is generally designated by reference numeral 100. The system 100 has also been specifically designed to manufacture rigid, reinforced, urethane structures and, accordingly, is described for use in such applications.

The system 100 includes a first component source 112 for storing a supply of a first component, e.g., liquid isocyanate, and a second component source 114 for storing a supply of a second component, e.g., liquid polyol resin. The system also includes a mixing and dispensing device 116 within which the two components are finally brought together and mixed and from which the mixture is dispensed.

A supply system connects the component sources 112 and 114 to the mixing and dispensing device 116 and includes first and second component delivery systems 118 and 120, respectively, which include pumps 122 and 124, respectively, driven by common pump drive means 125 for delivering the components from the sources to the mixing and dispensing device 116. Pumps 122 and 124 and pump drive means 125 are generally designated by reference numeral 140.

Each component source includes a heating means 128 and 130, respectively, for lowering the viscosity of the components to desired temperatures within the sources. As will be described more fully hereinafter, component sources 112 and 114 preferably comprise standard 55-gallon drums within which the components are normally shipped and stored.

First component delivery system 118 includes a transfer pump 161 connected at the output of first source 112 to transfer the first component from first source 112 to pumping system 140. Transfer pump 161 comprises an air-driven, reciprocating, piston pump connected to a source of factory air, illustrated at 162. A delivery control valve 163 is provided in the air line to control the operation of the pump 161.

The output of pump 161 is connected to the input of delivery pump 122 via conduit 166, accumulator tank 167, and conduit 168. Accumulator 167 ensures that a supply of liquid is present at the input to delivery pump 122. The output of pump 122 is connected by conduit 169 to a first portion of heat exchanger 145 which heats the first component to a desired temperature to be mixed with the second component in mixing and dispensing device 116. The first component output of heat exchanger 145 is connected via conduit 146 to mixing and dispensing device 116. A return conduit 141 returns the first component from the mixing and dispensing device back to source 112 through an on-off ball valve 141a to provide a closed loop delivery system for recirculating the first component from source 112 to the mixing and dispensing device 116 and back to the source 112. By turning valve 141a "off," the entire output of pump 122 flows from the mixing and dispensing device 116.

Similarly, second component delivery system 120 includes transfer pump 181 connected to the output of second source 114 for pumping the second component to pumping system 140. Transfer pump 181 is identical to transfer pump 161 and is coupled to factory air source 162 via delivery control valve 183. The output of pump 181 is connected to the input of delivery pump 124 via conduit 186, accumulator 187, and conduit 188. The output of pump 124 is connected by conduit 189 to a second portion of heat exchanger 145 which heats the second component to a desired temperature. Conduit 192 connects the second component output of heat exchanger 145 to mixing and dispensing device 116. Second component delivery system 120 further includes return conduit 142 for returning the second component from the mixing and dispensing device 116 to second source 114. On-off ball valve 142a can close return conduit 142 and direct the entire output of pump 124 from the mixing and dispensing device 116.

Component delivery systems 118 and 120 are separate from one another. The first and second components circulate through their respective delivery systems and do not come into contact with one another except in the mixing and dispensing device 116 during spraying.

Mixing and dispensing device 116, which is described in detail above, comprises a hand-held spray gun which carries all the controls that are necessary to operate the system once the system is set up. For example, a gun trigger simultaneously operates valve means mounted on the gun, schematically represented in FIG. 1 by elements 143 and 144, to permit the first and second components in component delivery systems 118 and 120, respectively, to flow into a mixing chamber within the spray gun. The first and second components are thoroughly mixed, and the mixture is dispensed through an outlet orifice in the gun onto a substrate 350. As explained, the mixture is preferably dispensed in the form of a relatively flat, elongated spray pattern 147. If desired, a chopper 148 can be mounted to the mixing and dispensing device 116 to dispense reinforcing glass fibers 149 into the spray pattern 147 to be incorporated into the urethane structure being manufactured.

The system also includes delivery control and calibration means, generally designated by reference numerals 151 and 152, to assist in system setup and operation. The delivery control and calibration means 151 and 152 permit isolation of first and second sources 112 and 114 from the atmosphere, permit accurate calibration of the flow rate of the components from the mixing and dispensing device 116, permit monitoring of the component temperature and pressure of the system and permit the components' temperatures to be elevated and stabilized within the sources 112 and 114 prior to operation.

As shown in FIG. 12, substantially the entire system illustrated in FIG. 11, except for sources 112 and 114, is adapted to be supported on a wheeled base 196 so that it may be easily moved from location to location for use. A mast and boom assembly 197, including a mast 198 and a boom 199, extends upwardly and outwardly from the base 196 and supports the various conduits leading to and from the mixing and dispensing device 116 and the several air lines leading to the mixing and dispensing device 116 as will be described. At least the boom 199 is preferably constructed to have a variable extent, for example, hinged and folding, so that it may be extended outwardly to the desired length for most convenient use.

The various fluid and air conduits in the system are preferably constructed of materials that are chemically inert to the component materials and that are flexible in nature so as to permit substantially unencumbered movement of the dispensing device 116 mounted to the ends of the various conduits during use. The conduits are preferably nylon or include a nylon inner tubing. Substantial portions of the conduits are also enclosed within a flexible sleeve 195 to protect the conduits and to prevent them from becoming entangled in one another.

FIG. 13 is a perspective view of first component source 112. Second component source 114 is substantially identical in construction and, therefore, will not be described.

Source 112 (and 114) preferably comprises a standard 55-gallon drum 131 within which the component is normally shipped and stored. By utilizing the 55-gallon drums as the sources 112 and 114, separate storage vessels or tanks which increase the cost of the system and which must be periodically refilled from the supply drum are not required. The top 132 of drum 131 includes an inlet port 133 and an outlet port 134. Inlet port 133 is used to recirculate isocyanate into the tank from return conduit 141 (FIG. 11).

Transfer pump 161 is mounted to outlet port 134 to withdraw the first component from drum 131. A pick-up tube 139 is connected to the input of pump 161 and extends into the drum substantially to the bottom thereof. The pump outlet is connected to conduit 166 to transfer the first component to delivery pump 122 via accumulator tank 167.

Transfer pump 161 (and transfer pump 181) comprises an air-driven, reciprocating, piston pump driven from a central air source 162 (FIG. 11). A delivery control valve 163 and an air pressure gauge 165 are provided in the air line from the air source to control the operation of pump 161. A similar valve 183 and air pressure gauge 185 are provided in the air line from air source 162 to pump 181 (FIG. 11). A suitable transfer pump for use in system 110 comprises Model 900 Transfer pump marketed by Glas-Craft, Inc.

A heater 128 is provided to maintain the first component at an elevated temperature to maintain the material at the proper viscosity to ensure reliable flow of the component out of the drum and through the system. Heater 128 can conveniently comprise a band heater such as a Model RS-112 Drum Heater marketed by Glas-Craft, Inc. Such heater includes a thermostat 128a to control the temperature of the material in the drum.

As also shown in FIG. 13, return line 141 is connected to inlet 133 of drum 131 by a delivery control and calibration means 151, whose operation is described in greater detail below and which is identical to the delivery control and calibration means 152 carried on the second source 114.

FIGS. 14A and 14B illustrate pumping system 140 of the system of FIGS. 11 and 12. As previously described, pumping system 140 includes a first positive displacement pump 122 for pumping the first component around the first delivery system 118 and a second positive displacement pump 124 for pumping the second component around the second delivery system 120.

In the invention, pumps 122 and 124 comprise positive displacement piston pumps simultaneously operated by a common drive means 125. Specifically, drive means 125 comprises a single, reciprocating, air-driven, variable ratio (1:1-2.5:1) piston motor 151 connected to piston pumps 122 and 124 by a linkage mechanism 154. Linkage mechanism 154 includes first and second linkage members 158 and 159 connecting the piston motor 151 to the pistons of the first and second delivery pumps 122 and 124, respectively. Specifically, the inner ends 158a and 159a of first and second linkage members 158 and 159 are pivotally connected to opposite ends of a central coupling member 156 rigidly mounted to the end of piston motor drive rod 157 by rotatable couplings 161 and 162, respectively. The outer ends 158b and 159b of linkage members 158 and 159 are pivotally mounted to connector members 166 and 167 by rotatable couplings 163 and 164, respectively. Connector members 166 and 167 are, in turn, connected to a rigid frame generally designated by reference numeral 165. Thus, as drive rod 157 reciprocates up and down during the operation of drive motor 151, linkage member 158 will be caused to pivot around rotatable coupling 163 first in a counter-clockwise direction (from the FIG. 14A to the FIG. 14B position) and then in a clockwise direction (back to the FIG. 14A position); and linkage member will be caused to pivot around coupling 164 first in a clockwise direction (from the FIG. 14A to the FIG. 14B position) and then in a counterclockwise direction (back to the FIG. 14A position).

Piston rods 152 and 153 of pumps 122 and 124 are pivotally connected to linkage members 158 and 159, respectively, at positions intermediate the ends thereof by sleeve members 176 and 177. Therefore, as the linkage members pivot back and forth around rotatable couplings 163 and 164, respectively, piston rods 152 and 153 will be simultaneously reciprocated up and down to operate the piston rods of pumps 122 and 124. The pump cylinders 170 and 171 within which pistons connected to piston rods 152 and 153 reciprocate are also pivotally mounted to frame 165 by rotatable couplings 172 and 173 to maintain smooth longitudinal movement of the piston rods within the cylinders as the linkage members pivot around their respective pivots. The dotted line representation of piston pump 124 identified by reference numeral 124a in FIG. 14B illustrates the ability of the piston pump to move during operation of the drive means 125.

Typically, when producing urethane structures, the isocyanate and the polyol are mixed in a 1:1 ratio. The materials, however, do not have the same viscosity and specific gravity, and, therefore, these components should be pumped into the mixing chamber of the mixing and dispensing device 116 at somewhat different rates. Accordingly, it is desirable to adjust the rates of flow from the piston pumps 122 and 124 to achieve uniform mixing of the components. Such an adjustment can avoid an initial and transient imbalance of flow upon triggering the mixing and dispensing device 116.

In the invention, the pumps 122 and 124 can be easily independently adjusted by the mechanism permitting separate adjustment of the stroke length of the pistons in the pumps. As shown in FIGS. 14A and 14B, the positions of sleeves 176 and 177 are adjustable along the lengths of first and second linkage members 158 and 159 by first and second manually rotatable threaded rods 178 and 179 which are mounted to first and second linkage members 158 and 159, respectively, and which extend through threaded apertures 181 and 182 in sleeves 176 and 177. By rotating threaded rods 178 and 179, the sleeves 176 and 177 can be moved back or forth along the lengths of linkage members 158 and 159. By moving sleeves 176 and 177 closer to the inner ends 158a and/or 159a of the linkage members, the stroke length of the piston rods 152 and 153 of pumps 22 and 24 is increased as the linkage members are pivoted back and forth during reciprocation of motor 151. To reduce the stroke length of one or both of the pumps, the positions of sleeves 176 and/or 177 are simply moved toward the outer ends 158b and/or 159b of the linkage members 158 and 159. Thus, as shown in FIG. 14B, the output of pump 124 will be decreased in the position shown in dotted lines 124a because rotation of threaded rod 179 has moved sleeve 177 to the position shown in dotted lines 179a where the distance that piston rod 153a is reciprocated by motor 151 is less than the distance rod 153 is reciprocated in the solid line position of FIG. 14B.

The invention includes a pumping system in which a single, low-cost, air-driven, piston motor drives the two positive displacement piston pumps 122 and 124 while permitting independent adjustment of the displacement of pumps 122 and 124 to independently control the rate of component flow through delivery systems 118 and 120 to and from the mixing and dispensing device 116. Costly and relatively complex, hydraulically operated proportioning pumps and their associated hydraulic power systems used in prior systems, are eliminated, resulting in a more reliable, less complex, and lower cost system.

Figure 15:
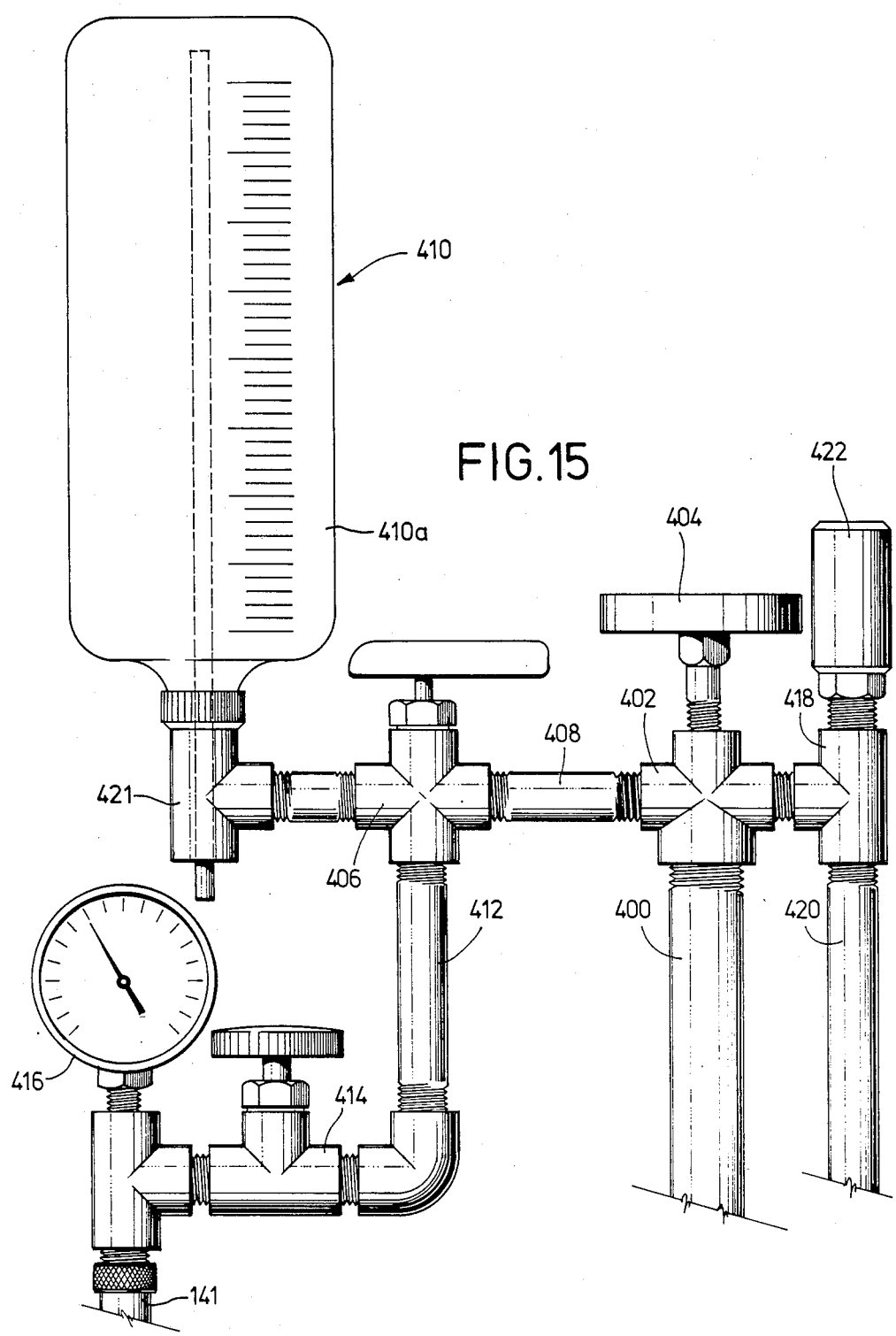
FIG. 15 is a perspective view of a different arrangement of delivery control and calibration means incorporated in the system of FIGS. 11, 12 and 13.

The system also includes delivery control and calibration means 151 and 152 which are adapted to be carried on the 55-gallon drums of first and second component sources 112 and 114, respectively. As shown in FIG. 11, FIG. 13, and FIG. 15, the delivery control and calibration means 151 (and the identical means 152) includes a support pipe 400 which is threaded into the input fitting 133 in the top 132 of drum 131. At the top of the support pipe 400 is a standard cruciform fitting 402 which is threaded onto support pipe 400 at one end of the cross. A thermometer 404 is threaded into the other end of cruciform fitting 402. A three-way valve 406 is supported from a side opening of cruciform fitting 402 by a short length of pipe 408. Connected to the other openings of three-way valve 406 are a graduated calibration means 410 and a pipe 412 leading to a restrictive orifice means 414.

As shown in FIG. 15, the restrictive orifice means 414 is provided in the delivery control and calibration means 151, preferably located at the delivery control and calibrating means 151 where return line 141 is connected to the means (see FIG. 11). The restrictive orifice may be fixed or variable. A variable restrictive orifice means is preferable as shown in FIGS. 13 and 15. Such a variable restrictive orifice may be the variable flow control valve manufactured by Indianapolis Valve and Fitting Company, 1681 Expo Lane, Indianapolis, Ind. 46224, as its Model SS-1RF4. A fixed orifice may be used if the viscosities of the two components remain the same in operation of the system.

A pressure gauge 416 is also attached to the delivery control and calibration means 151 between the return line 141 and the restrictive orifice means 414 to measure the fluid pressure in the return line 141 from the mixing and dispensing device 116 (gun 200). A T fitting pipe connection 418 is connected to the cruciform fitting 402. One opening of T fitting 418 leads to a three-way valve 422 and transfer pump 161. A check valve 419 is connected to the other opening of T fitting 418 to permit the drum source 112 to be charged with nitrogen gas.

Delivery control and calibration means 152 for the second component is identical in structure.

During start-up of the system, valve 422 can be placed in a position permitting the transfer pump 161 to be operated and recirculate the component material from drum 112 through pipes 420 and 400 into the drum as it is being heated by heater 128. With the system in operation, valve 422 is placed in a position blocking flow into pipe 420.

During start-up of the system, or at any time during system operation, valves 143 and 144 of the mixing and dispensing device can be closed and the flow of the first and second components can be directed through the return lines 141 and 142, respectively, to delivery control and calibration means 151 and 152, respectively, for measurement and calibrating. In calibrating or measuring the flow from the gun, the flow rate at the output of pumps 121 and 124 is measured and the system operating pressure is adjusted until the pressure measured on pressure gauges 416 and 516 match the output pressures of pumps 122 and 124, respectively. The restrictive orifices 414 and 514 provide a resistance to flow comparable to the resistance between the pumps 122 and 124 and the output of mixing and dispensing device 116. By then placing three-way valves 406 and 506 in position to direct the flow into the graduated calibration means 410 and 510 for a measured increment of time, the volume flow rate and mass flow rate of the first and second components can be measured.

Calibration means 410 and 510 are graduated, closed, inverted containers 410a and 510a whose openings are threaded onto T connections 421 and 521 to an output of three-way valves 406 and 506 as shown in FIG. 13 and FIG. 15. The calibration means includes slender tubes (see 410a of FIGS. 13 and 15) within the graduated container and leading from adjacent their tops to atmosphere to avoid pressure build-up in the bottle during calibrations.

During normal operation of the system, three-way valves 406 and 506 are positioned to direct flow from the recirculating return lines 141, 142, restrictive orifice means 414, 514, and pipes 412, 512, into pipes 408, 508, cruciform fittings 402, 502, support pipes 400, 500, and sources 112, 114. During normal operation, the flow path from the component material includes the restrictive orifices 414 and 514. In operations where orifices 414 and 514 offer too much resistance to flow for satisfactory operation, the system may be provided with valving systems either permitting the restrictive orifice means to be removed from the flow path or to be by-passed in normal operations.

When the system is shut down, three-way valves 406 and 506 can be placed into an off position to close the sources 112 and 114 to the entry of air and moisture which can degrade the plural component materials. If desirable, the sources 112 and 114 may be charged with nitrogen gas through check valves 422 and 522.

Mixing and dispensing device 116 is identical to the mixing and dispensing device illustrated in FIGS. 6-9 and described above.

The gun 200 is adapted to be connected to the component delivery systems 118 and 120 by connections 207 and 208 (FIG. 7) positioned near the forward end of the gun. More particularly, connections 207 and 208 are provided with fittings 209, 210, respectively, adapted to be coupled to complementary fittings (one complementary fitting 211 is visible in FIG. 10) to which the component lines 172, 192, 141, and 142 are connected. More specifically, in FIG. 10, fitting 209 is coupled to fitting 211. Fluid line 172 carrying the first component (isocyanate) to the gun and fluid line 141 carrying the first component from the gun back to supply source 112 are both connected to fitting 211 so as to permit the continuous circulating flow of the first component around the first delivery system 118. Although not completely illustrated in the drawings, a similar fitting is used to connect lines 192 and 142 of second component delivery system 120 to fitting 210 and connection 208 (FIG. 7) so as to permit the second component (polyol) to recirculate through the second delivery system 120.

Under normal conditions, when the gun 200 is not in use and when trigger 202 is not depressed, the first and second components will simply recirculate through their respective component delivery systems; and neither of the components will enter into the gun itself to be dispensed. Upon depressing the trigger 202, however, valve means within the gun (schematically identified as elements 143 and 144 in FIG. 11) will be actuated to allow the components to enter into the gun body 203 through fittings 209 and 210 to be mixed and dispensed as described above. If advisable, the on-off valves 141a and 142a can be turned off so that the return flows of the components through conduits 141 and 142 are blocked.

Because the operation of the mixing and dispensing device 116 (gun 200) and the chopper 148 of system 100 are the same as gun 200 and chopper 48 of system 10 described above, the detailed description of these components and their operation will not be repeated.

As indicated above, the system of the invention is particularly designed to produce fiber-reinforced urethane structures for various applications. The system of the invention provides substantial advantages of prior systems which have been insatisfactory in handling the materials to manufacture rigid polyurethane structures.

While what has been described constitutes a presently most preferred embodiment of the invention, it should be understood that various modifications and changes can be made. For example, as indicated above, the system can be used to produce a variety of plural component structures in addition to urethane structures; and different component materials can be used to produce these structures. Also, if desired, the system could be readily modified to handle more than two components to be mixed and dispensed from the spray gun. Accordingly, it should be understood that the invention is to be limited only insofar as is required by the scope of the following claims.

I claim:

1. A system for manufacturing solid structures from mixed reactive urethane components, comprising:
   (a) a first source of a resin component for a reactive urethane chemical system;
   (b) a second source of an isocyanate component for said reactive urethane chemical system;
   (c) a supply system for providing a flow of said urethane components to a sprayer, said supply system comprising:
      (i) a first positive displacement pump connected to said first source of said resin component;
      (ii) a second positive displacement pump connected to said second source of said isocyanate component; and
      (iii) common drive means for said first and second positive displacement pumps;
   (d) a sprayer connected to said supply system for mixing the resin component and the isocyanate component and for forming particles of mixed urethane components to be directed from the sprayer by an operator; and (e) means for calibrating the rate of flow of said urethane components through said first and second delivery systems, said calibrating means including a first calibrated test container connected to said first delivery system through a first switching valve, a second calibrated test container connected to said second delivery system through a second switching valve, and control means for operating said first and second switching valves for a controlled time duration so that the flow of each of said components is directed into said first and second calibrated test containers for the same time period whereby the rates of flow of each component in its respective delivery system can be measured and calibrated.

2. The system of claim 1 wherein said first and second positive displacement pumps comprise first and second vane pumps, each of said vane pumps including a rotor carrying a plurality of vanes for urging said urethane components to flow through said supply system, and wherein said common drive means comprises a common drive shaft connected to each of said vane pump rotors, and a single constant speed electric motor for driving said common drive shaft.

3. The system of claim 1 wherein said first and second sources include means for controlling the temperature of the urethane components in said sources.

4. The system of claim 3 wherein said first and second sources comprise first and second pressure tanks, respectively, and wherein said temperature control means comprises a temperature controlled immersion heater within each said tank.

5. The system of claim 1 wherein said first and second sources each include a component inlet and a component outlet, and wherein said supply system includes a first delivery system and a second delivery system, said first delivery system including first conduit means for recirculating the resin component from the outlet of said first source to said sprayer and from said sprayer to the inlet of said first source, and said second delivery system including second conduit means for recirculating the isocyanate component from the outlet of said second source to said sprayer and from said sprayer to the inlet of said second source.

6. The system of claim 1 wherein said first positive displacement pump is connected to the outlet of said first source and said second positive displacement pump is connected to the outlet of said second source.

7. The system of claim 1 wherein said first and second conduit means comprise flexible conduit means.

8. The system of claim 1 wherein said sprayer includes valve means for controlling the flow of said resin and isocyanate components between said first and second delivery systems, respectively, and said sprayer.

9. The system of claim 1 wherein said first and second switching valves are connected to said first and second delivery systems, respectively, at the outputs of said first and second positive displacement pumps, respectively; and wherein one outlet of each of said switching valves is connected with said sprayer and a second outlet of each of said switching valves is connected to said first and second calibrated test containers, respectively.

10. The system of claim 1 and further including means for indicating the temperature of each of said components adjacent said sprayer.

11. The system of claim 1 and further including means for forming elongated fiber lengths for reinforcement of a urethane structure, and for permitting said lengths of fiber to be directed by said operator to be mixed with said particles of mixed urethane components to be directed from the sprayer by the operator.

12. A method for forming a solid reinforced structure of urethane material comprising:
providing a temperature-controlled supply of a first urethane component of components of a urethane material to be reacted together;
providing a temperature-controlled supply of a second urethane component of the components of urethane material to be reacted together;
generating a controlled flow of the first urethane component with a first pump means, said controlled flow of the first urethane component being directed through a first conduit connected with said first pump, said sprayer and said temperature-controlled supply of said first urethane component for obtaining a consistent spraying temperature for said first urethane component;
continuously recirculating said first urethane component through said first conduit between said sprayer and said temperature-controlled supply of said first urethane component for obtaining a consistent spraying temperature for said first urethane component;
generating a controlled flow of the second urethane component with a second pump means, said controlled flow of the second urethane component being directed through a second conduit connected with said second pump, said sprayer and said temperature-controlled supply of said second urethane component;
continuously recirculating said second urethane component through said second conduit between said sprayer and said temperature-controlled supply of said second component for obtaining a consistent spraying temperature for said second urethane component;
providing a temperature-controlled supply of a first urethane component of components of a urethane material to be reacted together;
providing a temperature-controlled supply of a second urethane component of the components of urethane material to be reacted together;
generating a controlled flow of the first urethane component with a first pump means, said controlled flow of the first urethane component being directed through a first conduit connected with said first pump, said sprayer and said temperature-controlled supply of said first urethane component;
continuously recirculating said first urethane component through said first conduit between said sprayer and said temperature-controlled supply of said first urethane component for obtaining a consistent spraying temperature for said first urethane component;
generating a controlled flow of the second urethane component with a second pump means, said controlled flow of the second urethane component being directed through a second conduit connected with said second pump, said sprayer and said temperature-controlled supply of said second urethane component;
continuously recirculating said second urethane component through said second conduit between said sprayer and said temperature-controlled supply of said second component for obtaining a consistent spraying temperature for said second urethane component;

calibrating the rates of flow of said first and second urethane components and driving said first and second pump means by a common driving means to maintain their relative calibration;

mixing the urethane components to be reacted at the spraying zone and breaking the mixed urethane components into particles directed at a substrate to form the solid structure;

directing lengths of reinforcing fiber into the particles of urethane components being directed at the substrate;

controlling the pressures of the flowing urethane components at the spraying zone to break the mixed urethane components into particles having mass-to-surface ratios sufficiently large such that the mixed urethane components wet the lengths of reinforcing fiber; and reacting the urethane components on the substrate and in contact with the wetted fibers to form said solid reinforced structure.

13. The method of claim 12 wherein said pressure of said flowing urethane components at the spraying zone are from about 250 psi to about 500 psi.

14. The method of claim 12 wherein said mixed urethane components are directed at said substrate in a spray pattern of generally elongated, flat cross section and the mass-to-surface ratios of the particles in the spray pattern are characterized by those of such a spray having an average particle diameter of about 0.032 to about 0.080 inch.

15. A system for manufacturing solid structures from mixed reactive urethane components, comprising:
(a) a first source of a resin component for a reactive urethane chemical system;
(b) a second source of an isocyanate component for said reactive urethane chemical system;
(c) a sprayer for mixing the resin component and the isocyanate component and for forming particles of mixed urethane components to be directed from the sprayer by an operator;
(d) a supply system for providing a flow of said urethane components to a sprayer, said supply system comprising:
 (i) a first positive displacement pump connected to said first source of said resin component;
 (ii) a second positive displacement pump connected to said second source of said isocyanate component;
 (iii) Common drive means for said first and second positive displacement pumps;
 (iv) a resin delivery system including first conduit means connecting said first source, said first positive displacement pulp, and said sprayer, and including second conduit means for recirculating said resin from said sprayer to said first source, and further including a first delivery control and calibration system at said first source providing means to calibrate the rate of flow of resin from said sprayer, said first delivery control and calibration means including first pressure indicating means adapted to indicate the pressure of said resin at said sprayer, first flow restrictive means to simulate, in said first delivery control and calibration means, the flow paths of said sprayer, fifth conduit means permitting recirculation of said resin at said first source, and first valve means permitting the selection of the calibration means, the recirculation means, or the closing off of the first source; and
 (v) an isocyanate delivery system including third conduit means connecting said second source, said second positive displacement pump, and said sprayer, and including fourth conduit means for recirculating said isocyanate from said sprayer to said second source, and further including a second delivery control and calibration system providing means to calibrate the rate of flow of isocyanate form said sprayer, said second delivery control and calibration means including a second pressure indicating means adapted to indicate pressure of said isocyanate at said sprayer, second flow restrictive means to simulate, in said second delivery control and calibration means, the flow paths of said sprayer, sixth conduit means permitting recirculation of said isocyanate at said second source, and second valve means permitting the selection of the calibration means, the circulation means, or the closing off of the second source.

16. The system of claim 15 wherein said first and second sources comprise first and second 55-gallon shipping drums for said components, and said first and second delivery control and calibration systems are located on said first and second, drums.

17. The system of claim 16 and further including first and second band heaters mounted to said first and second 55-gallon drums, respectively, for heating the first and second components in said first and second 55-gallon drums.

18. A system for manufacturing structures from mixed reactive components comprising:
(a) a first source of a first component for a reactive chemical system;
(b) a second source of a second component for said reactive chemical system;
(c) a mixing and dispensing device for mixing said first and second components and for dispensing said mixture;
(d) a first positive displacement delivery system for maintaining a flow of said first component from said first source to said mixing and dispensing device and from said mixing and dispensing device back to said first source;
(e) a second positive displacement delivery system for maintaining a flow of said second component from said second source to said mixing and dispensing device and from said mixing and dispensing device back to said second source;
(f) a common drive means for driving said first and second positive displacement delivery systems;
(g) means for permitting the independent adjustment of the variation of the displacement of said first and second positive displacement delivery systems;
(h) means associated with said mixing and dispensing device for selectively directing the flow of said first and second components from said first and second delivery systems into said mixing and dispensing device to be mixed therein and the mixture dispensed therefrom; and
(i) means for calibrating the rate of flow of said first and second components through said first and second delivery systems, respectively, comprising a first calibrated test container, a second calibrated test container, and means for directing the flow of said first and second components from said first and second delivery systems into said first and second calibrated test containers for a controlled time duration.

19. The system of claim 18 wherein said first and second positive displacement delivery systems comprise first and and second piston pumps, and wherein said independent adjustment means comprises means for independently adjusting the stroke length of said first and second piston pumps.

20. The system of claim 18 wherein said common drive means includes a reciprocating motor and a linkage mechanism coupling said reciprocating motor to said first and second piston pumps for reciprocating said first and second piston pumps.

21. The system of claim 20 wherein said linkage mechanism includes first and second linkage members coupling said reciprocating motor to the piston rods of said first and second piston pumps, respectively, and wherein said adjustment means includes first and second adjustment means for independently adjusting the position at which said piston rods are attached to said first and second linkage members, respectively.

22. The system of claim 21 wherein said first and second adjustment means comprise first and second threaded rods for adjusting the position of said piston rods along the length of said first and second linkage members, respectively.

23. The system of claim 18 wherein said first and second sources comprise first and second standard shipping drums for said components.

24. The system of claim 18 wherein said first component comprises polyol, said second component comprises isocyanate, and said structure comprises a rigid urethane structure.

25. The system of claim 18, comprising:
chopper means for forming elongated lengths of fiber and for directing said lengths of fiber into said mixture dispensed from said sprayer; and
means responsive to operation of said sprayer for automatically actuating said chopper means to form said lengths of fiber and to direct said lengths of fiber into said mixture dispensed from said sprayer.

26. A system for manufacturing structures from mixed reactive components comprising:
 (a) a first source of a first component for a reactive chemical system;
 (b) a second source of a second component for said reactive chemical system;
 (c) a mixing and dispensing device for mixing said first and second components and for dispensing said mixture;
 (d) a first positive displacement delivery system for maintaining a flow of said first component from said first source to said mixing and dispensing device and from said mixing and dispensing device back to said first source;
 (e) a second positive displacement delivery system for maintaining a flow of said second component from said second source to said mixing and dispensing device and from said mixing and dispensing device back to said second source;
 (f) a common drive means for driving said first and second positive displacement delivery systems;
 (g) means for permitting the independent adjustment of the variation of the displacement of said first and second positive displacement delivery systems;
 (h) means associated with said mixing and dispensing device for selectively directing the flow of said first and second components from said first and second delivery systems into said mixing and dispensing device to be mixed therein and dispensed therefrom;
 (i) a first delivery control and calibration means for said fist component; and
said first and second delivery control and calibration means being carried by the first and second sources of components, respectively, and each delivery control and calibration means being adapted to permit calibration of the flow from the mixing and dispensing device from adjacent said first and second source of components.

* * * * *